US011979893B2

(12) United States Patent
Wu et al.

(10) Patent No.: US 11,979,893 B2
(45) Date of Patent: May 7, 2024

(54) RESOURCE CONFIGURATION METHOD, TERMINAL, AND NETWORK DEVICE

(71) Applicant: VIVO MOBILE COMMUNICATION CO., LTD., Guangdong (CN)

(72) Inventors: Yumin Wu, Dongguan (CN); Xueming Pan, Dongguan (CN); Peng Sun, Dongguan (CN)

(73) Assignee: Vivo Mobile Communication Co., Ltd., Dongguan (CN)

(*) Notice: Subject to any disclaimer, the term of this patent is extended or adjusted under 35 U.S.C. 154(b) by 528 days.

(21) Appl. No.: 17/205,097

(22) Filed: Mar. 18, 2021

(65) Prior Publication Data

US 2021/0204297 A1 Jul. 1, 2021

Related U.S. Application Data

(63) Continuation of application No. PCT/CN2019/103016, filed on Aug. 28, 2019.

(30) Foreign Application Priority Data

Sep. 21, 2018 (CN) .......................... 201811110744.3

(51) Int. Cl.
*H04W 72/53* (2023.01)
*H04B 7/06* (2006.01)
(Continued)

(52) U.S. Cl.
CPC .......... *H04W 72/53* (2023.01); *H04B 7/0626* (2013.01); *H04L 1/1819* (2013.01);
(Continued)

(58) Field of Classification Search
None
See application file for complete search history.

(56) References Cited

U.S. PATENT DOCUMENTS

2009/0327831 A1* 12/2009 Xue ...................... H04L 1/1819 714/751
2018/0219664 A1* 8/2018 Guo ...................... H04W 24/10
(Continued)

FOREIGN PATENT DOCUMENTS

CN 101800991 A 8/2010
CN 106465391 A 2/2017
(Continued)

OTHER PUBLICATIONS

Supplementary European Search Report for Application No. 19863518.7-1205/3855662—PCT/CN2019/103016, dated Oct. 15, 2021.
(Continued)

*Primary Examiner* — Rebecca E Song
(74) *Attorney, Agent, or Firm* — Harness, Dickey & Pierce, P.L.C.

(57) ABSTRACT

A resource configuration method includes: obtaining resource configuration information of a semi-persistent resource, where the resource configuration information includes identification information of a plurality of transmission carriers and resource allocation information corresponding to identification information of each transmission carrier; and determining, based on the resource configuration information of the semi-persistent resource, at least one of information about a resource position available for the transmission carrier in each resource period or a HARQ process serial number available for the transmission carrier in each resource period.

12 Claims, 5 Drawing Sheets

(51) Int. Cl.

| | |
|---|---|
| ***H04L 1/1812*** | (2023.01) |
| ***H04L 5/00*** | (2006.01) |
| ***H04W 56/00*** | (2009.01) |
| ***H04W 72/0446*** | (2023.01) |
| ***H04W 72/0453*** | (2023.01) |
| ***H04W 72/23*** | (2023.01) |
| ***H04W 80/02*** | (2009.01) |

(52) U.S. Cl.

CPC ......... *H04L 5/0051* (2013.01); *H04W 56/001* (2013.01); *H04W 72/0446* (2013.01); *H04W 72/0453* (2013.01); *H04W 72/23* (2023.01); *H04W 80/02* (2013.01)

(56) References Cited

U.S. PATENT DOCUMENTS

| | | | |
|---|---|---|---|
| 2019/0166616 A1 | 5/2019 | Liu et al. | |
| 2019/0174522 A1 | 6/2019 | Xiao et al. | |
| 2019/0191416 A1 | 6/2019 | Xie et al. | |
| 2019/0230654 A1 | 7/2019 | Luo et al. | |
| 2019/0349145 A1 | 11/2019 | You | |
| 2019/0357180 A1* | 11/2019 | Miao | H04W 72/23 |
| 2020/0053756 A1* | 2/2020 | Sun | H04W 72/1273 |

FOREIGN PATENT DOCUMENTS

| | | | |
|---|---|---|---|
| CN | 107371260 | A | 11/2017 |
| CN | 108023705 | A | 5/2018 |
| CN | 108307502 | A | 7/2018 |
| CN | 108401301 | A | 8/2018 |
| WO | WO-2018027926 | A1 | 2/2018 |
| WO | WO-2018137539 | A1 | 8/2018 |

OTHER PUBLICATIONS

"Semi-Persistent Scheduling with Carrier Aggregation," Motorola, 3GPP-TSG-RAN-WG2 Meeting #66bis, R2-094546, Aug. 28, 2009.

"MAC-layer impacts of bandwidth aggregation," Motorola, 3GPP TSG-RAN-WG2 Meeting #65bis, R2-092357, Mar. 27, 2009.

International Search Report and Written Opinion of the International Searching Authority regarding International Application No. PCT/CN2019/103016, dated Oct. 31, 2019. Translation provided by Bohui Intellectual Property.

"Corrections to Multiple SPS Configurations Introduced in HRLLC," Ericsson, 3GPP TSG-WG2 Meeting #103, R2-1813372, dated Aug. 24, 2018.

First Office Action regarding Chinese Patent Application No. 201811110744.3, dated Aug. 31, 2020. Translation provided by Bohui Intellectual Property.

Second Office Action regarding Chinese Patent Application No. 201811110744.3, dated Feb. 10, 2021. Translation provided by Bohui Intellectual Property.

* cited by examiner

RESOURCE CONFIGURATION METHOD, TERMINAL, AND NETWORK DEVICE

CROSS-REFERENCE TO RELATED APPLICATIONS

This application is a Bypass Continuation Application of PCT/CN2019/103016 filed on Aug. 28, 2019, which claims priority to Chinese Patent Application No. 201811110744.3 filed in China on Sep. 21, 2018, which are incorporated herein by reference in their entirety.

TECHNICAL FIELD

This disclosure relates to the technical field of communication applications, and in particular, to a resource configuration method, a terminal, and a network device.

BACKGROUND

In order to reach a target downlink transmission rate of 20 Gbps and a target uplink transmission rate of 10 Gbps, high-frequency communication and massive antenna technologies are introduced to a fifth generation (5G) mobile communications system. In high-frequency communication, a wider system bandwidth and a smaller antenna size can be provided to facilitate deployment of a large quantity of antennas in base stations and user equipments (UEs). Using multi-beam (Multi-beam) or multi-transmission reception point (Multi-TRP) for data transmission and reception on the base station side and using multi-beam or multi-TRP transmission point for transmission and reception on the UE side may be widely applied.

SUMMARY

According to a first aspect, some embodiments of this disclosure provide a resource configuration method, including:

obtaining resource configuration information of a semi-persistent resource, where the resource configuration information includes identification information of a plurality of transmission carriers and resource allocation information corresponding to identification information of each transmission carrier;

determining, based on the resource configuration information of the semi-persistent resource, at least one of information about a resource position available for the transmission carrier in each resource period or a hybrid automatic repeat request (HARQ) process serial number available for the transmission carrier in each resource period.

Optionally, the determining information about a resource position available for the transmission carrier in each resource period based on the resource configuration information of the semi-persistent resource includes:

in a case in which activation signaling transmitted by a network device is received, determining a start position of the semi-persistent resource based on the activation signaling, and determining information about a start resource position available for the transmission carrier in each resource period based on the resource configuration information and the start position of the semi-persistent resource; or in a case in which the resource allocation information comprises allocation information of a resource in each resource period, determining the information about the resource position available for the transmission carrier in each resource period based on allocation information of the semi-persistent resource in each resource period.

Optionally, the semi-persistent resource is a downlink semi-persistent scheduling (SPS) resource, an uplink configured grant type 2 resource, or an autonomous uplink (AUL) resource.

Optionally, the determining information about a resource position available for the transmission carrier in each resource period based on the resource configuration information of the semi-persistent resource includes:

determining information about a start resource position available for the transmission carrier in each resource period based on the resource configuration information of the semi-persistent resource; or in a case in which the resource allocation information comprises allocation information of a resource in each resource period, determining the information about the resource position available for the transmission carrier in each resource period based on allocation information of the semi-persistent resource in each resource period.

Optionally, the semi-persistent resource is an uplink configured grant type 1 resource.

Optionally, when there is one HARQ process available in each resource period, the determining a HARQ process serial number available for the transmission carrier in each resource period based on the resource configuration information of the semi-persistent resource includes:

in a case in which different transmission carriers correspond to different HARQ entities, determining a HARQ process serial number available for each transmission carrier in each resource period based on the resource periodicity, a current slot number, a quantity of slots per system frame, and a quantity of HARQ processes for the semi-persistent resource; or in a case in which different transmission carriers correspond to a same HARQ entity and correspond to different HARQ process serial numbers, determining a HARQ process serial number available for each transmission carrier in each resource period based on the resource periodicity, a current slot number, a quantity of slots per system frame, a quantity of HARQ processes for the semi-persistent resource, and a HARQ process identifier offset.

Optionally, the semi-persistent resource is a downlink SPS resource, an uplink configured grant type 1 resource, or an uplink configured grant type 2 resource.

Optionally, when there are a plurality of HARQ processes available in each resource period, the determining a HARQ process serial number available for the transmission carrier in each resource period based on the resource configuration information of the semi-persistent resource includes:

in a case in which different transmission carriers correspond to different HARQ entities, determining a HARQ process serial number for a start resource for the transmission carrier in each resource period based on a current slot number, a quantity of slots per system frame, the resource periodicity, a quantity of HARQ processes for the semi-persistent resource, and a quantity of HARQ processes per resource period; and determining a HARQ process serial number for a subsequent resource in each resource period based on a resource period number and a resource number; or in a case in which different transmission carriers correspond to a same HARQ entity and correspond to different HARQ process serial numbers, determining a HARQ process serial number for a start resource for the transmission carrier in each resource period based on a current slot number, a quantity of slots per system frame, the resource periodicity, a quantity of HARQ processes for the semi-persistent resource, a quantity of HARQ processes per resource period, and a HARQ process identifier offset; and determining a HARQ process serial number for a subsequent resource in each resource period based on a resource period number and a resource number.

Optionally, the semi-persistent resource is a downlink SPS resource or an uplink configured grant type 1 resource.

Optionally, when there are a plurality of HARQ processes available in each resource period, the determining a HARQ process serial number available for the transmission carrier in each resource period based on the resource configuration information of the semi-persistent resource includes:

in a case in which different transmission carriers correspond to different HARQ entities, determining a HARQ process serial number for a start resource for the transmission carrier in each resource period based on a current slot number, a quantity of slots per system frame, the resource periodicity, and a quantity of HARQ processes for the semi-persistent resource; and determining a HARQ process serial number for a subsequent resource in each resource period based on a resource period number and a resource number; or in a case in which different transmission carriers correspond to a same HARQ entity and correspond to different HARQ process serial numbers, determining a HARQ process serial number for a start resource for the transmission carrier in each resource period based on a current slot number, a quantity of slots per system frame, the resource periodicity, a quantity of HARQ processes for the semi-persistent resource, and a HARQ process identifier offset; and determining a HARQ process serial number for a subsequent resource in each resource period based on a resource period number and a resource number.

Optionally, the semi-persistent resource is an uplink configured grant type 2 resource.

According to a second aspect, some embodiments of this disclosure further provide a resource configuration method, including:

transmitting resource configuration information of a semi-persistent resource, where the resource configuration information includes identification information of a plurality of transmission carriers and resource allocation information corresponding to identification information of each transmission carrier.

According to a third aspect, some embodiments of this disclosure further provide a terminal, including:

a processor configured to obtain resource configuration information of a semi-persistent resource, where the resource configuration information includes identification information of a plurality of transmission carriers and resource allocation information corresponding to identification information of each transmission carrier; and determine, based on the resource configuration information of the semi-persistent resource, at least one of information about a resource position available for the transmission carrier in each resource period or a HARQ process serial number available for the transmission carrier in each resource period.

According to a fourth aspect, some embodiments of this disclosure further provide a terminal, including a memory, a processor, and a computer program stored in the memory and capable of running on the processor, and when the computer program is executed by the processor, the steps of the resource configuration method according to the first aspect are implemented.

According to a fifth aspect, some embodiments of this disclosure further provide a network device, including:

a transmitting module, configured to transmit resource configuration information of a semi-persistent resource, where the resource configuration information includes identification information of a plurality of transmission carriers and resource allocation information corresponding to identification information of each transmission carrier.

According to a sixth aspect, some embodiments of this disclosure further provide a network device, including a memory, a processor, and a computer program stored in the memory and capable of running on the processor, and when the computer program is executed by the processor, the steps of the resource configuration method according to the second aspect are implemented.

According to a seventh aspect, some embodiments of this disclosure further provide a non-transitory computer-readable storage medium, where a computer program is stored in the non-transitory computer-readable storage medium, and when the computer program is executed by a processor, the steps of the resource configuration method according to the first aspect are implemented, or the steps of the resource configuration method according to the second aspect are implemented.

BRIEF DESCRIPTION OF DRAWINGS

To describe the technical solutions in the embodiments of this disclosure more clearly, the following briefly introduces the accompanying drawings required for describing the embodiments of this disclosure. Apparently, the accompanying drawings in the following description show merely some embodiments of this disclosure, and a person of ordinary skill in the art may still derive other drawings from these accompanying drawings.

DESCRIPTION OF EMBODIMENTS

Exemplary embodiments of this disclosure will be described below in more detail with reference to the accompanying drawings. Although the accompanying drawings show exemplary embodiments of this disclosure, it should be understood that this disclosure may be implemented in various forms and should not be limited by the embodiments described herein. Instead, these embodiments are provided so that this disclosure will be better understood, and the scope of this disclosure can be conveyed to those skilled in the art.

In the specification and claims of this disclosure, the terms "include", "have", and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, product, or device. Use of "and/or" in the specification and claims represents at least one of connected objects.

Examples provided in the following description are not intended to limit the scope, applicability, or configuration described in the claims. Functions and arrangements of discussed elements may be changed without departing from the scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Figure 1:
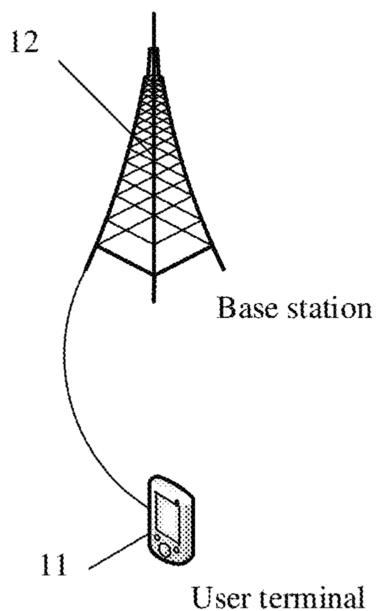
FIG. 1 is a structural diagram of a network system applied to some embodiments of this disclosure.

Referring to FIG. 1, FIG. 1 is a structural diagram of a network system applied to some embodiments of this disclosure. As shown in FIG. 1, the network system includes a user terminal 11 and a base station 12. The user terminal 11 may be referred to as user equipment (User Equipment, UE), for example, may be a terminal-side device such as a mobile phone, a tablet computer (Tablet Personal Computer), a laptop computer (Laptop Computer), a personal digital assistant (Personal Digital Assistant, PDA), a mobile Internet device (Mobile Internet Device, MID), or a wearable device (Wearable Device). It should be noted that a specific type of the user terminal 11 is not limited in the embodiments of this disclosure. The base station 12 may be a base station of 5G or a later release (for example, a gNB or a 5G NR NB), or a base station in another communications system, or be referred to as a NodeB, an evolved NodeB, a transmission reception point (TRP), or another term in the art. Provided that the same technical effects are achieved, the base station is not limited to a specific technical term. It should be noted that only the 5G base station is used as an example in some embodiments of this disclosure, and a specific type of the base station 12 is not limited.

In the related art, the 5G system may configure semi-persistent data transmission resources for UEs, including downlink semi-persistent scheduling (DL SPS), uplink configured grant type 1 (UL configured grant Type 1), uplink configured grant type 2 (UL configured grant Type 2), and AUL.

When different beams or transmission points are used for data transmission or reception for UE, there is still no definite solution to configuration of semi-persistent resources.

Figure 2:
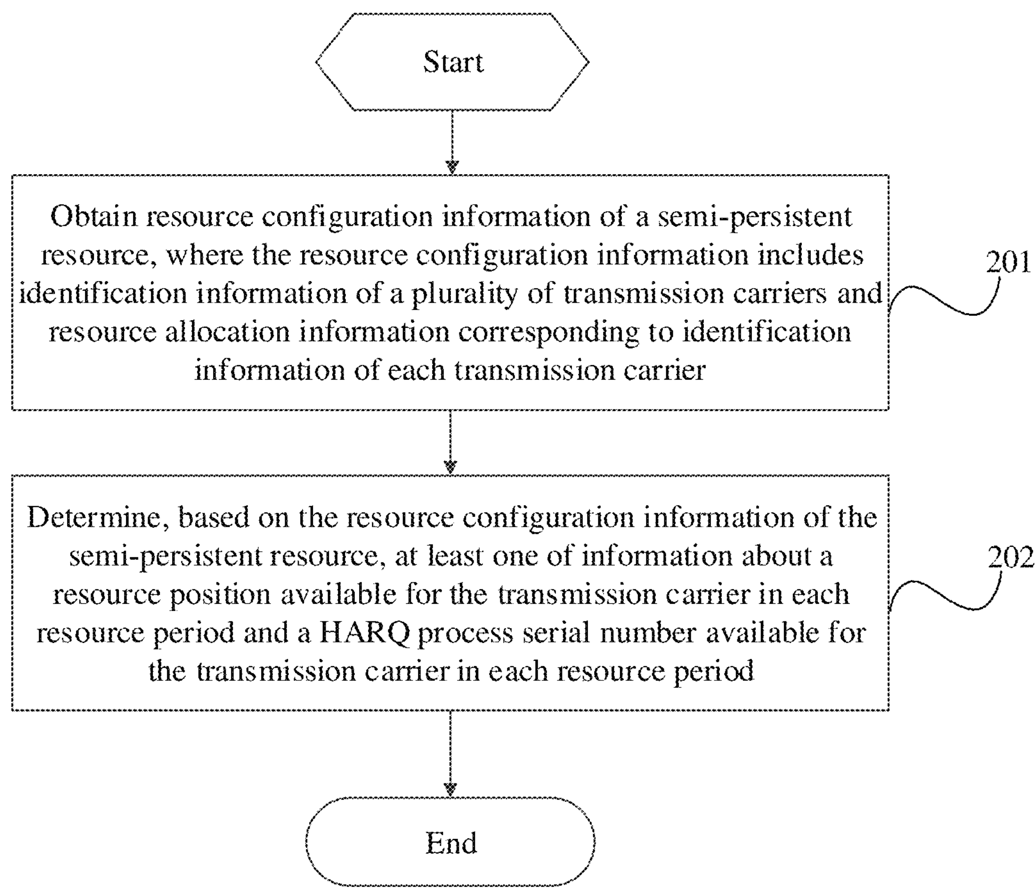
FIG. 2 is a schematic flowchart 1 of a resource configuration method according to some embodiments of this disclosure.

As shown in FIG. 2, some embodiments of this disclosure provide a resource configuration method applied to a terminal. The method includes the following steps.

Step 201: obtain resource configuration information of a semi-persistent resource, where the resource configuration information includes identification information of a plurality of transmission carriers and resource allocation information corresponding to identification information of each transmission carrier.

The transmission carrier includes a beam or a transmission reception point. The resource allocation information includes a resource periodicity.

The identification information of the transmission carrier includes: at least one of a transmission carrier identifier, a cell identity corresponding to the transmission carrier, a frequency identifier corresponding to the transmission carrier, a BWP identifier corresponding to the transmission carrier, a control channel identifier corresponding to the transmission carrier, or a medium access control (MAC) entity identifier corresponding to the transmission carrier.

For example, the cell identity corresponding to the transmission carrier may be specifically cell 1, the frequency identifier corresponding to the transmission carrier may be specifically frequency 1, the bandwidth part (BWP) identifier corresponding to the transmission carrier may be specifically BWP_1, and the MAC entity identifier corresponding to the transmission carrier may be specifically MAC_1.

The transmission carrier identifier includes: at least one of a synchronization signal block (SSB) identifier, a channel state information reference signal (CSI-RS) identifier, or a port number identifier corresponding to a reference signal, where the reference signal includes an SSB and/or a CSI-RS.

In addition to the SSB identifier and/or the CSI-RS identifier, the transmission carrier identifier may be another signal identifier, which is not specifically limited herein.

The port number identifier corresponding to the reference signal may be specifically port_1, and the reference signal may be a reference signal other than the SSB and the CSI-RS, which is not specifically limited herein.

The control channel identifier corresponding to the transmission carrier includes: at least one of a type identifier of a control channel, a resource position identifier of the control channel, a reference signal identifier of the control channel, or a port number identifier corresponding to a reference signal of the control channel.

The type identifier of the control channel may be specifically physical downlink control channel (PDCCH)_1 of a primary cell (PCell). The resource position identifier of the control channel may be a control resource set (CORESET) and/or search space identifier. The reference signal identifier of the control channel may be an SSB identifier and/or a CSI-RS identifier.

Step 202: determine, based on the resource configuration information of the semi-persistent resource, at least one of information about a resource position available for the transmission carrier in each resource period or a HARQ process serial number available for the transmission carrier in each resource period.

Optionally, the information about the resource position available for the transmission carrier in each resource period and the HARQ process serial number available for the transmission carrier in each resource period are determined based on the resource configuration information of the semi-persistent resource.

For a downlink semi-persistent scheduling SPS resource, an uplink configured grant type 2 resource, or an AUL resource, the determining information about a resource position available for the transmission carrier in each resource period based on the resource configuration information of the semi-persistent resource includes:

in a case in which activation signaling transmitted by a network device is received, determining a start position of the semi-persistent resource based on the activation signaling, and determining information about a start resource position available for the transmission carrier in each resource period based on the resource configuration information and the start position of the semi-persistent resource; or in a case in which the resource allocation information includes allocation information of a resource in each resource period, determining the information about the resource position available for the transmission carrier in each resource period based on allocation information of the semi-persistent resource in each resource period.

For an uplink configured grant type 1 resource, the determining information about a resource position available for the transmission carrier in each resource period based on the resource configuration information of the semi-persistent resource includes:

determining information about a start resource position available for the transmission carrier in each resource period based on the resource configuration information of the semi-persistent resource; or in a case in which the resource allocation information includes allocation information of a resource in each resource period, determining the information about the resource position available for the transmission carrier in each resource period based on allocation information of the semi-persistent resource in each resource period.

For a downlink SPS resource, an uplink configured grant type 1 resource, or an uplink configured grant type 2 resource, when there is one HARQ process available in each resource period, the determining a HARQ process serial number available for the transmission carrier in each resource period based on the resource configuration information of the semi-persistent resource includes:

in a case in which different transmission carriers correspond to different HARQ entities, determining a HARQ process serial number available for each transmission carrier in each resource period based on the resource periodicity, a current slot number, a quantity of slots per system frame, and a quantity of HARQ processes for the semi-persistent resource; or in a case in which different transmission carriers correspond to a same HARQ entity and correspond to different HARQ process serial numbers, determining a HARQ process serial number available for each transmission carrier in each resource period based on the resource periodicity, a current slot number, a quantity of slots per system frame, a quantity of HARQ processes for the semi-persistent resource, and a HARQ process identifier offset.

For a downlink SPS resource or an uplink configured grant type 1 resource, when there are a plurality of HARQ processes available in each resource period, the determining a HARQ process serial number available for the transmission carrier in each resource period based on the resource configuration information of the semi-persistent resource includes:

in a case in which different transmission carriers correspond to different HARQ entities, determining a HARQ process serial number for a start resource for the transmission carrier in each resource period based on a current slot number, a quantity of slots per system frame, the resource periodicity, a quantity of HARQ processes for the semi-persistent resource, and a quantity of HARQ processes per resource period; and determining a HARQ process serial number for a subsequent resource in each resource period based on a resource period number and a resource number; or in a case in which different transmission carriers correspond to a same HARQ entity and correspond to different HARQ process serial numbers, determining a HARQ process serial number for a start resource for the transmission carrier in each resource period based on a current slot number, a quantity of slots per system frame, the resource periodicity, a quantity of HARQ processes for the semi-persistent resource, a quantity of HARQ processes per resource period, and a HARQ process identifier offset; and determining a HARQ process serial number for a subsequent resource in each resource period based on a resource period number and a resource number.

For an uplink configured grant type 2 resource, when there are a plurality of HARQ processes available in each resource period, the determining a HARQ process serial number available for the transmission carrier in each resource period based on the resource configuration information of the semi-persistent resource includes:

in a case in which different transmission carriers correspond to different HARQ entities, determining a HARQ process serial number for a start resource for the transmission carrier in each resource period based on a current slot number, a quantity of slots per system frame, the resource periodicity, and a quantity of HARQ processes for the semi-persistent resource; and determining a HARQ process serial number for a subsequent resource in each resource period based on a resource period number and a resource number; or in a case in which different transmission carriers correspond to a same HARQ entity and correspond to different HARQ process serial numbers, determining a HARQ process serial number for a start resource for the transmission carrier in each resource period based on a current slot number, a quantity of slots per system frame, the resource periodicity, a quantity of HARQ processes for the semi-persistent resource, and a HARQ process identifier offset; and determining a HARQ process serial number for a subsequent resource in each resource period based on a resource period number and a resource number.

According to the resource configuration method in some embodiments of this disclosure, the resource configuration information of the semi-persistent resource is obtained, where the resource configuration information includes the identification information of the plurality of transmission carriers and the resource allocation information corresponding to the identification information of each transmission carrier. At least one of the information about the resource position available for the transmission carrier in each resource period or the HARQ process serial number available for the transmission carrier in each resource period is determined based on the resource configuration information of the semi-persistent resource. In this way, different semi-persistent resources are configured for different uplink transmission carriers and/or downlink transmission carriers, thereby improving utilization of the semi-persistent resources in a case of a plurality of transmission carriers, and reducing a delay caused by scheduling during data transmission.

In an optional implementation, the resource allocation information further includes: at least one of allocation information of a semi-persistent resource for the transmission carrier in each resource period or a quantity of HARQ processes for the semi-persistent resource for the transmission carrier.

Herein, the semi-persistent resource is a downlink SPS resource, an uplink configured grant type 2 resource, or an AUL resource.

When the semi-persistent resource is a downlink SPS resource and there is one HARQ process available in each resource period, the resource allocation information further includes the allocation information of the semi-persistent resource for the transmission carrier in each resource period.

When the semi-persistent resource is a downlink SPS resource and there are a plurality of HARQ processes available in each resource period, the resource allocation information further includes at least one of the allocation information of the semi-persistent resource for the transmission carrier in each resource period or the quantity of HARQ processes for the semi-persistent resource for the transmission carrier.

In another optional implementation, the resource allocation information further includes: at least one of allocation information of a semi-persistent resource for the transmission carrier in each resource period, a time-domain offset of the semi-persistent resource for the transmission carrier, or a time-domain length occupied by each time-domain resource in the semi-persistent resource for the transmission carrier.

Herein, the semi-persistent resource is an uplink configured grant type 1 resource.

For example, the time-domain offset may be specifically 10 orthogonal frequency division multiplex (OFDM) symbols, and for a position of system frame number (SFN) equal to 0, the semi-persistent resource for the transmission carrier may be the $10^{th}$ symbol. The time-domain length occupied by each time domain resource may be two symbols.

The allocation information of the semi-persistent resource for the transmission carrier in each resource period includes: at least one of information about a start position for resource allocation, a resource allocation bitmap, resource allocation duration, or a resource allocation short period, where duration of the resource allocation short period is less than duration of the resource period.

For example, the information about the start position for resource allocation may be specifically slot 2, or an offset with respect to an activation position is 2 slots. The resource allocation bitmap may be specifically positions of 10 slots identified by 10 bits, and a resource in a slot position identified by a bit with a value of 1 is determined as a resource allocated to the terminal. The resource allocation duration may be specifically, for a resource with a 40-ms period, resource allocation duration of 10 ms from a start position of the resource. The resource allocation short period may be specifically: for a resource with a 40-ms period, there is resource allocation duration of 10 ms every 40 ms, and the resource allocation short period is 2 ms within the 10 ms.

In a first optional implementation, the semi-persistent resource is a downlink SPS resource, and there is one HARQ process available in each resource period.

The downlink SPS resource is a periodic downlink resource configured by a network side, and one downlink resource is allocated in each period. The network side activates or deactivates the use of the SPS resource by using PDCCH control signaling. The PDCCH control signaling indicates that a position of an activated resource, for example, a start system frame number ($SFN_{start\ time}$) and a start slot number ($slot_{start\ time}$), is a start position of the resource.

The determining information about a resource position available for the transmission carrier in each resource period based on the resource configuration information of the semi-persistent resource in Step 202 includes:

in a case in which activation signaling transmitted by a network device is received, determining a start position of the semi-persistent resource based on the activation signaling, and determining information about a start resource position available for the transmission carrier in each resource period based on the resource configuration information and the start position of the semi-persistent resource.

The activation signaling may be PDCCH activation signaling, and the terminal determines, based on the activation signaling, the start position of the semi-persistent resource, for example, $SFN_{start\ time}$ and $slot_{start\ time}$. The terminal determines the information about the start resource position available for the transmission carrier in each resource period based on the resource configuration information and the start position of the semi-persistent resource by using the following formula:

$$CURRENT\_slot=[(N_{SlotsPerFrame}\times SFN_{start\ time}+slot_{start\ time})+N\times T_{periodicity}\times N_{SlotsPerFrame}/10]\ \text{modulo}(1024\times N_{SlotsPerFrame}),$$

where

CURRENT_slot represents a current slot number, and $CURRENT\_slot=N_{SlotsPerFrame}\times SFN+N_{Slotnumber\ intheframe}$;

$N_{slotnumber\ intheframe}$ is a slot number in a current system frame; SFN represents a current system frame number; $N_{SlotsPerFrame}$ represents a quantity of slots per system frame; $SFN_{start\ time}$ represents a start system frame number; $slot_{start\ time}$ represents a start slot number; N represents the $N^{th}$ resource; and $T_{periodicity}$ represents a resource periodicity configured by using a radio resource control (RRC) message.

Alternatively, in a case in which the resource allocation information includes allocation information of a resource in each resource period, the information about the resource position available for the transmission carrier in each resource period is determined based on allocation information of the semi-persistent resource in each resource period.

The allocation information of the semi-persistent resource for the transmission carrier in each resource period includes: at least one of information about a start position for resource allocation, a resource allocation bitmap, resource allocation duration, or a resource allocation short period, where duration of the resource allocation short period is less than duration of the resource period.

Based on the allocation information, the terminal may specifically determine the information about the resource position available for the transmission carrier in each resource period by using the following methods.

Method 1: the allocation information includes a resource allocation bitmap, and the resource allocation bitmap is a 10-bit bitmap. In this case, the available resource position is determined from 10 bits starting from the start position.

Method 2: the allocation information includes resource allocation duration, for example, 10 ms. In this case, resources within a time of 10 ms starting from the start position are determined as the resources available for the transmission carrier in each resource period.

Method 3: the allocation information includes resource allocation duration such as 10 ms and a resource allocation short period such as 2 ms. In this case, within a time of 10 ms starting from the start position, one available resource is allocated to the terminal every 2 ms.

In the first optional implementation, the determining a HARQ process serial number available for the transmission carrier in each resource period based on the resource configuration information of the semi-persistent resource in Step 202 includes:

in a case in which different transmission carriers correspond to different HARQ entities, determining a HARQ process serial number available for each transmission carrier in each resource period based on the resource periodicity, a current slot number, a quantity of slots per system frame, and a quantity of HARQ processes for the semi-persistent resource.

The HARQ process serial number available for each transmission carrier in each resource period is determined by using the following formula:

$$\text{HARQ Process ID}=[\text{floor}(\text{CURRENT\_slot}\times 10/(N_{SlotsPerFrame}\times T_{periodicity}))] \text{ modulo } N_{HARQ\text{-}Processes},$$

where $N_{HARQ\text{-}Processes}$ represents a quantity of HARQ processes configured for the SPS resource by using the RRC message; and HARQ Process ID represents a HARQ process serial number available for the transmission carrier in each resource period.

Alternatively, in a case in which different transmission carriers correspond to a same HARQ entity and correspond to different HARQ process serial numbers, a HARQ process serial number available for each transmission carrier in each resource period is determined based on the resource periodicity, a current slot number, a quantity of slots per system frame, a quantity of HARQ processes for the semi-persistent resource, and a HARQ process identifier offset.

The HARQ process serial number available for each transmission carrier in each resource period is determined by using the following formula:

$$\text{HARQ Process ID}=[\text{floor}(\text{CURRENT\_slot}\times 10/(N_{SlotsPerFrame}\times T_{periodicity}))] \text{ modulo } N_{HARQ\text{-}processes}+\text{Offset}_{HARQ\ process\ ID},$$

where $\text{Offset}_{HARQ\ process\ ID}$ represents a HARQ process identifier offset.

The HARQ process identifier offset includes: at least one of a start number of HARQ process identifiers for the transmission carrier, an end number of HARQ process identifiers for the transmission carrier, or a quantity of numbers available for HARQ process identifiers for the transmission carrier.

Optionally, in the first optional implementation, the network device configures or the protocol specifies HARQ configuration information available for the terminal, and the HARQ configuration information includes a quantity of HARQ processes for the semi-persistent resource, for example, a total quantity of HARQ processes available for the semi-persistent resource is 4.

In the first optional implementation, the network device determines the information about the resource position available for the transmission carrier in each resource period and the HARQ process serial number available for the transmission carrier in each resource period by using the same method described above, and transmits data based on the determined information about the resource position available and the determined HARQ process serial number available. In this case, the terminal receives, at the corresponding position, the data transmitted by the network device.

Optionally, during data transmission based on the determined information about the resource position available and the determined HARQ process serial number available, the network device first detects whether a resource corresponding to the information about the resource position available and the HARQ process serial number are idle, and if the resource and the HARQ process serial number are idle, transmits the data.

In a second optional implementation, the semi-persistent resource is a downlink SPS resource, and there are a plurality of HARQ processes available in each resource period.

Herein, the downlink SPS resource is a periodic downlink resource configured by the network side, and one downlink resource is allocated in each period. The network side activates or deactivates the use of the SPS resource by using PDCCH control signaling. The PDCCH control signaling indicates that a position of an activated resource, for example, a start system frame number ($SFN_{start\ time}$) and a start slot number ($slot_{start\ time}$), is a start position of the resource.

The determining information about a resource position available for the transmission carrier in each resource period based on the resource configuration information of the semi-persistent resource in Step 202 includes:

in a case in which activation signaling transmitted by a network device is received, determining a start position of the semi-persistent resource based on the activation signaling, and determining information about a start resource position available for the transmission carrier in each resource period based on the resource configuration information and the start position of the semi-persistent resource; or in a case in which the resource allocation information includes allocation information of a resource in each resource period, determining the information about the resource position available for the transmission carrier in each resource period based on allocation information of the semi-persistent resource in each resource period.

Herein, in the second optional implementation, the specific implementation process of determining the information about the resource position available for the transmission carrier in each resource period is the same as the specific implementation process of determining the information about the resource position available for the transmission carrier in each resource period in the first optional implementation described above, and details are not described herein again.

In the second optional implementation, the determining a HARQ process serial number available for the transmission carrier in each resource period based on the resource configuration information of the semi-persistent resource in Step 202 includes:

in a case in which different transmission carriers correspond to different HARQ entities, determining a HARQ process serial number for a start resource for the transmission carrier in each resource period based on a current slot number, a quantity of slots per system frame, the resource periodicity, a quantity of HARQ processes for the semi-persistent resource, and a quantity of HARQ processes per resource period; and determining a HARQ process serial number for a subsequent resource in each resource period based on a resource period number and a resource number.

A HARQ process serial number for a start resource for each transmission carrier in each resource period is first determined by using the following formula:

$$\text{HARQ Process ID}=[\text{floor}(\text{CURRENT\_slot}\times 10/(N_{SlotsPerFrame}\times T_{periodicity}))] \text{ modulo } (N_{HARQ\text{-}processes}/N_{HARQ\text{-}ProcessesPerPeriod}).$$

Then, remaining HARQ process serial numbers are sequentially allocated based on the resource period number and the resource number.

$N_{HARQ\text{-}ProcessesPerPeriod}$ represents a quantity of HARQ processes available in each resource period.

For example, $T_{periodicity}=10$, $N_{HARQ\text{-}Processes}=4$, $N_{HARQ\text{-}ProcessesPerPeriod}=2$, and the network side configures two resource positions in each period. In this case, "HARQ process serial number=1" is for the $1^{st}$ resource in the $1^{st}$ resource period; "HARQ process serial number=2" is for the $1^{st}$ resource in the $2^{nd}$ resource period; "HARQ process serial number=1" is for the $1^{st}$ resource in the $3^{rd}$ resource period; "HARQ process serial number=2" is for the $1^{st}$ resource in the $4^{th}$ resource period; and so on. "HARQ process serial number=3" is for the $2^{nd}$ resource in the $1^{st}$ resource period; "HARQ process serial number=4" is for the $2^{nd}$ resource in the $2^{nd}$ resource period; "HARQ process serial number=3" is for the $2^{nd}$ resource in the $3^{rd}$ resource period; "HARQ process serial number=4" is for the $2^{nd}$ resource in the $4^{th}$ resource period; and so on.

Alternatively, in a case in which different transmission carriers correspond to a same HARQ entity and correspond to different HARQ process serial numbers, a HARQ process serial number for a start resource for the transmission carrier in each resource period is determined based on a current slot number, a quantity of slots per system frame, the resource periodicity, a quantity of HARQ processes for the semi-persistent resource, a quantity of HARQ processes per resource period, and a HARQ process identifier offset; and a HARQ process serial number for a subsequent resource in each resource period is determined based on a resource period number and a resource number.

A HARQ process serial number for a start resource of each transmission carrier in each resource period is determined by using the following formula:

$$\text{HARQ Process ID}=[\text{floor}(\text{CURRENT\_slot}\times 10/(N_{SlotsPerFrame}\times T_{periodicity}))]\ \text{modulo}(N_{HARQ\text{-}Processes}/N_{HARQ\text{-}ProcessesPerPeriod})+\text{Offset}_{HARQ\ Process\ ID},$$ where $\text{Offset}_{HARQ\ process\ ID}$ represents a HARQ process identifier offset.

The HARQ process identifier offset includes: at least one of a start number of HARQ process identifiers for the transmission carrier, an end number of HARQ process identifiers for the transmission carrier, or a quantity of numbers available for HARQ process identifiers for the transmission carrier.

Optionally, in the second optional implementation, the network device configures or the protocol specifies HARQ configuration information available for the terminal, and the HARQ configuration information includes: at least one of a quantity of HARQ processes for the semi-persistent resource, a HARQ process serial number for the semi-persistent resource (for example, numbers of HARQ processes available for the semi-persistent resource are 1, 2, 3, and 4), a quantity of HARQ processes available for the semi-persistent resource in each resource period (for example, two HARQ processes are available in each resource period), or a HARQ process serial number available for the semi-persistent resource in each resource period.

For example, the UE has a total of four available HARQ processes, and two HARQ processes are available in each resource period. In this case, from the start activation position for the UE, the HARQ process serial numbers in the $1^{st}$ resource period are 1 and 2; the HARQ process serial numbers in the $2^{nd}$ period are 3 and 4; the HARQ process serial numbers in the $3^{rd}$ period are 1 and 2; the HARQ process serial numbers in the $4^{th}$ period are 3 and 4; and so on.

In the second optional implementation, the network device determines the information about the resource position available for the transmission carrier in each resource period and the HARQ process serial number available for the transmission carrier in each resource period by using the same method described above, and transmits data based on the determined information about the resource position available and the determined HARQ process serial number available. In this case, the terminal receives, at the corresponding position, the data transmitted by the network device.

Optionally, during data transmission based on the determined information about the resource position available and the determined HARQ process serial number available, the network device first detects whether a resource corresponding to the information about the resource position available and the HARQ process serial number are idle, and if the resource and the HARQ process serial number are idle, transmits the data.

In a third optional implementation, the semi-persistent resource is an uplink configured grant type 1 resource, and there is one HARQ process available in each resource period.

Herein, the uplink configured grant type 1 resource is a periodic uplink resource configured by the network side. One uplink resource is allocated in each period and can be used after being configured by using RRC, not requiring activation by using a PDCCH control signaling.

The determining information about a resource position available for the transmission carrier in each resource period based on the resource configuration information of the semi-persistent resource in Step 202 includes:

determining information about a start resource position available for the transmission carrier in each resource period based on the resource configuration information of the semi-persistent resource.

$$[(\text{SFN}\times N_{SlotsPerFrame}\times N_{SymbolsPerSlot})+(N_{Slotnumber\ intheframe}\times N_{SymbolsPerSlot})+N_{symbol\ number\ in\ the\ slot}]=(\text{Offset}_{timeDomain}\times N_{SymbolsPerslot}+S+N\times T_{periodicity})\ \text{modulo}(1024\times N_{SlotsPerFrame}\times N_{SlotsPerFrame}\times N_{SymbolsPerSlot}),$$

where $N_{SlotsPerFrame}$ represents a quantity of slots per system frame; $N_{SymbolsPerSlot}$ represents a quantity of symbols in each slot; $N_{Slotnumber\ intheframe}$ represents a slot number in a current system frame; $\text{Offset}_{timeDomain}$ represents an offset of a time domain resource with respect to SFN=0; N represents the $N^{th}$ resource; S represents a start symbol number; $T_{periodicity}$ represents a resource periodicity configured by using a RRC message; and $N_{symbol\ number\ in\ the\ slot}$ represents a symbol number in a current slot.

$$\text{CURRENT\_symbol}=(\text{SFN}\times N_{SlotsPerFrame}\times N_{SymbolsPerSlot}+N_{Slotnumber\ intheframe}\times N_{SymbolsPerSlot}+N_{symbol\ number\ in\ the\ slot}),$$

where

CURRENT_symbol represents a current symbol number.

Alternatively, in a case in which the resource allocation information includes allocation information of a resource in each resource period, the information about the resource position available for the transmission carrier in each resource period is determined based on allocation information of the semi-persistent resource in each resource period.

The allocation information of the semi-persistent resource for the transmission carrier in each resource period includes: at least one of information about a start position for resource allocation, a resource allocation bitmap, resource allocation duration, or a resource allocation short period, where duration of the resource allocation short period is less than duration of the resource period.

Based on the allocation information, the terminal may specifically determine the information about the resource position available for the transmission carrier in each resource period by using the following methods.

Method 1: the allocation information includes a resource allocation bitmap, and the resource allocation bitmap is a 10-bit bitmap. In this case, the available resource position is determined from 10 bits starting from the start position.

Method 2: the allocation information includes resource allocation duration, for example, 10 ms. In this case, resources within a time of 10 ms starting from the start position are determined as the resources available for the transmission carrier in each resource period.

Method 3: the allocation information includes resource allocation duration such as 10 ms and a resource allocation short period such as 2 ms. In this case, within a time of 10 ms starting from the start position, one available resource is allocated to the terminal every 2 ms.

In the third optional implementation, the determining a HARQ process serial number available for the transmission carrier in each resource period based on the resource configuration information of the semi-persistent resource in Step 202 includes:

in a case in which different transmission carriers correspond to different HARQ entities, determining a HARQ process serial number available for each transmission carrier in each resource period based on the resource periodicity, a current slot number, a quantity of slots per system frame, and a quantity of HARQ processes for the semi-persistent resource; or in a case in which different transmission carriers correspond to a same HARQ entity and correspond to different HARQ process serial numbers, determining a HARQ process serial number available for each transmission carrier in each resource period based on the resource periodicity, a current slot number, a quantity of slots per system frame, a quantity of HARQ processes for the semi-persistent resource, and a HARQ process identifier offset.

The specific implementation process herein is the same as the implementation process in the foregoing first optional implementation, and details are not described herein again.

Optionally, in the third optional implementation, the network device configures or the protocol specifies HARQ configuration information available for the terminal, and the HARQ configuration information includes a quantity of HARQ processes for the semi-persistent resource, for example, a total quantity of HARQ processes available for the semi-persistent resource is 4.

In the third optional implementation, after determining the information about the resource position available for the transmission carrier in each resource period and the HARQ process serial number available for the transmission carrier in each resource period based on the resource configuration information of the semi-persistent resource, the terminal transmits data at the resource position available in each resource period by using a corresponding HARQ process serial number.

Optionally, during data transmission based on the determined information about the resource position available and the determined HARQ process serial number available, the terminal first detects whether a resource corresponding to the information about the resource position available and the HARQ process serial number are idle, and if the resource and the HARQ process serial number are idle, transmits the data.

In a fourth optional implementation, the semi-persistent resource is an uplink configured grant type 1 resource, and there are a plurality of HARQ processes available in each resource period.

Herein, the uplink configured grant type 1 resource is a periodic uplink resource configured by the network side. One uplink resource is allocated in each period and can be used after being configured by using RRC, not requiring activation by using a PDCCH control signaling.

The determining information about a resource position available for the transmission carrier in each resource period based on the resource configuration information of the semi-persistent resource in Step 202 includes:

determining information about a start resource position available for the transmission carrier in each resource period based on the resource configuration information of the semi-persistent resource; or in a case in which the resource allocation information includes allocation information of a resource in each resource period, determining the information about the resource position available for the transmission carrier in each resource period based on allocation information of the semi-persistent resource in each resource period.

The specific implementation process herein is the same as the implementation process in the foregoing third optional implementation, and details are not described herein again.

In the fourth optional implementation, the determining a HARQ process serial number available for the transmission carrier in each resource period based on the resource configuration information of the semi-persistent resource in Step 202 includes:

in a case in which different transmission carriers correspond to different HARQ entities, determining a HARQ process serial number for a start resource for the transmission carrier in each resource period based on a current slot number, a quantity of slots per system frame, the resource periodicity, a quantity of HARQ processes for the semi-persistent resource, and a quantity of HARQ processes per resource period; and determining a HARQ process serial number for a subsequent resource in each resource period based on a resource period number and a resource number; or in a case in which different transmission carriers correspond to a same HARQ entity and correspond to different HARQ process serial numbers, determining a HARQ process serial number for a start resource for the transmission carrier in each resource period based on a current slot number, a quantity of slots per system frame, the resource periodicity, a quantity of HARQ processes for the semi-persistent resource, a quantity of HARQ processes per resource period, and a HARQ process identifier offset; and determining a HARQ process serial number for a subsequent resource in each resource period based on a resource period number and a resource number.

The specific implementation process herein is the same as the implementation process in the foregoing second optional implementation, and details are not described herein again.

Optionally, in the fourth optional implementation, the network device configures or the protocol specifies HARQ configuration information available for the terminal, and the HARQ configuration information includes: at least one of a quantity of HARQ processes for the semi-persistent resource, a HARQ process serial number for the semi-persistent resource (for example, numbers of HARQ processes available for the semi-persistent resource are 1, 2, 3, and 4), a quantity of HARQ processes available for the semi-persistent resource in each resource period (for example, two HARQ processes are available in each resource period), or a HARQ process serial number available for the semi-persistent resource in each resource period.

For example, the UE has a total of four available HARQ processes, and two HARQ processes are available in each resource period. In this case, from the start activation position for the UE, the HARQ process serial numbers in the $1^{st}$ resource period are 1 and 2; the HARQ process serial numbers in the $2^{nd}$ period are 3 and 4; the HARQ process serial numbers in the $3^{rd}$ period are 1 and 2; the HARQ process serial numbers in the $4^{th}$ period are 3 and 4; and so on.

In the fourth optional implementation, after determining the information about the resource position available for the transmission carrier in each resource period and the HARQ process serial number available for the transmission carrier in each resource period based on the resource configuration information of the semi-persistent resource, the terminal transmits data at the resource position available in each resource period by using a corresponding HARQ process serial number.

Optionally, during data transmission based on the determined information about the resource position available and the determined HARQ process serial number available, the terminal first detects whether a resource corresponding to the information about the resource position available and the HARQ process serial number are idle, and if the resource and the HARQ process serial number are idle, transmits the data.

In a fifth optional implementation, the semi-persistent resource is an uplink configured grant type 2 resource, and there is one HARQ process available in each resource period.

Herein, the uplink configured grant type 2 resource is a periodic downlink resource configured by the network side, and one downlink resource is allocated in each period. The network side activates or deactivates the use of the uplink configured grant type 2 resource by using PDCCH control signaling. The PDCCH control signaling indicates that a position of an activated resource (for example, $SFN_{start\ time}$ (a start system frame number), $slot_{start\ time}$ (a start slot number), and $symbol_{start\ time}$ (a start symbol number)), is a start position of the resource.

The determining information about a resource position available for the transmission carrier in each resource period based on the resource configuration information of the semi-persistent resource in Step 202 includes:

in a case in which activation signaling transmitted by a network device is received, determining a start position of the semi-persistent resource based on the activation signaling, and determining information about a start resource position available for the transmission carrier in each resource period based on the resource configuration information and the start position of the semi-persistent resource.

The information about the start resource position available for the transmission carrier in each resource period is determined by the following formula:

$$[(\mathrm{SFN}\times N_{SlotsPerFrame}\times N_{SymbolsPerSlot})+N_{Slotnumber\ intheframe}\times N_{SymbolsPerSlot}+N_{symbol\ number\ in\ the\ slot}]=[(\mathrm{SFN}_{start\ time}\times N_{SlotsPerFrame}\times N_{SymbolPerSlot}+\mathrm{slot}_{start\ time}\times N_{SymbolsPerSlot}+\mathrm{symbol}_{start\ time})+N\times T_{periodicity}]\ \mathrm{modulo}(1024\times N_{SlotsPerFrame}\times N_{SymbolsPerSlot}),$$

where

SFN represents a current system frame number; $N_{SlotsPerFrame}$ represents a quantity of slots per system frame; $N_{SymbolsPerSlot}$ represents a quantity of symbols in each slot; $N_{Slotnumber\ intheframe}$ represents a slot number in a current system frame; and $N_{symbol\ number\ in\ the\ slot}$ represents a symbol number in a current slot.

Alternatively, in a case in which the resource allocation information includes allocation information of a resource in each resource period, the information about the resource position available for the transmission carrier in each resource period is determined based on allocation information of the semi-persistent resource in each resource period.

The allocation information of the semi-persistent resource for the transmission carrier in each resource period includes: at least one of information about a start position for resource allocation, a resource allocation bitmap, resource allocation duration, or a resource allocation short period, where duration of the resource allocation short period is less than duration of the resource period.

Based on the allocation information, the terminal may specifically determine the information about the resource position available for the transmission carrier in each resource period by using the following methods.

Method 1: the allocation information includes a resource allocation bitmap, and the resource allocation bitmap is a 10-bit bitmap. In this case, the available resource position is determined from 10 bits starting from the start position.

Method 2: the allocation information includes resource allocation duration, for example, 10 ms. In this case, resources within a time of 10 ms starting from the start position are determined as the resources available for the transmission carrier in each resource period.

Method 3: the allocation information includes resource allocation duration such as 10 ms and a resource allocation short period such as 2 ms. In this case, within a time of 10 ms starting from the start position, one available resource is allocated to the terminal every 2 ms.

In the fifth optional implementation, the determining a HARQ process serial number available for the transmission carrier in each resource period based on the resource configuration information of the semi-persistent resource in Step 202 includes:

in a case in which different transmission carriers correspond to different HARQ entities, determining a HARQ process serial number available for each transmission carrier in each resource period based on the resource periodicity, a current slot number, a quantity of slots per system frame, and a quantity of HARQ processes for the semi-persistent resource; or in a case in which different transmission carriers correspond to a same HARQ entity and correspond to different HARQ process serial numbers, determining a HARQ process serial number available for each transmission carrier in each resource period based on the resource periodicity, a current slot number, a quantity of slots per system frame, a quantity of HARQ processes for the semi-persistent resource, and a HARQ process identifier offset.

The specific implementation process herein is the same as the implementation process in the foregoing first optional implementation, and details are not described herein again.

Optionally, in the fifth optional implementation, the network device configures or the protocol specifies HARQ configuration information available for the terminal, and the HARQ configuration information includes a quantity of HARQ processes for the semi-persistent resource, for example, a total quantity of HARQ processes available for the semi-persistent resource is 4.

In the fifth optional implementation, after determining the information about the resource position available for the transmission carrier in each resource period and the HARQ process serial number available for the transmission carrier in each resource period based on the resource configuration information of the semi-persistent resource, the terminal transmits data at the resource position available in each resource period by using a corresponding HARQ process serial number.

Optionally, during data transmission based on the determined information about the resource position available and the determined HARQ process serial number available, the terminal first detects whether a resource corresponding to the information about the resource position available and the HARQ process serial number are idle, and if the resource and the HARQ process serial number are idle, transmits the data.

In a sixth optional implementation, the semi-persistent resource is an uplink configured grant type 2 resource, and there are a plurality of HARQ processes available in each resource period.

Herein, the uplink configured grant type 2 resource is a periodic downlink resource configured by the network side, and one downlink resource is allocated in each period. The network side activates or deactivates the use of the uplink configured grant type 2 resource by using PDCCH control signaling. The PDCCH control signaling indicates that a position of an activated resource (for example, $SFN_{start\ time}$ (a start system frame number), $slot_{start\ time}$ (a start slot number), and $symbol_{start\ time}$ (a start symbol number)), is a start position of the resource.

The determining information about a resource position available for the transmission carrier in each resource period based on the resource configuration information of the semi-persistent resource in Step 202 includes:

in a case in which activation signaling transmitted by a network device is received, determining a start position of the semi-persistent resource based on the activation signaling, and determining information about a start resource position available for the transmission carrier in each resource period based on the resource configuration information and the start position of the semi-persistent resource; or in a case in which the resource allocation information includes allocation information of a resource in each resource period, determining the information about the resource position available for the transmission carrier in each resource period based on allocation information of the semi-persistent resource in each resource period.

The specific implementation process herein is the same as the implementation process in the foregoing fifth optional implementation, and details are not described herein again.

In the sixth optional implementation, the determining a HARQ process serial number available for the transmission carrier in each resource period based on the resource configuration information of the semi-persistent resource in Step 202 includes:

in a case in which different transmission carriers correspond to different HARQ entities, determining a HARQ process serial number for a start resource for the transmission carrier in each resource period based on a current slot number, a quantity of slots per system frame, the resource periodicity, and a quantity of HARQ processes for the semi-persistent resource; and determining a HARQ process serial number for a subsequent resource in each resource period based on a resource period number and a resource number.

Specifically, the HARQ process serial number for the start resource of each transmission carrier in each resource period is first determined by using the following formula:

$$\text{HARQ Process ID}=[\text{floor}(\text{CURRENT\_slot}\times 10/(N_{SlotsperFrame}\times T_{periodicity}))]\text{modulo } N_{HARQ\text{-}processes}.$$

Then, remaining HARQ process serial numbers are sequentially allocated based on the resource period number and the resource number.

For example, $T_{periodocity}=10$, $N_{HARQ\text{-}Processes}=4$, $N_{HARQ\text{-}ProcessesPerPeriod}=2$, and the network side configures two resource positions in each period. In this case, "HARQ process serial number=1" is for the 1st resource in the 1st resource period; "HARQ process serial number=2" is for the 1st resource in the 2nd resource period; "HARQ process serial number=1" is for the 1st resource in the 3rd resource period; "HARQ process serial number=2" is for the 1st resource in the 4th resource period; and so on. "HARQ process serial number=3" is for the 2nd resource in the 1st resource period; "HARQ process serial number=4" is for the 2nd resource in the 2nd resource period; "HARQ process serial number=3" is for the 2nd resource in the 3rd resource period; "HARQ process serial number=4" is for the 2nd resource in the 4th resource period; and so on.

Alternatively, in a case in which different transmission carriers correspond to a same HARQ entity and correspond to different HARQ process serial numbers, a HARQ process serial number for a start resource for the transmission carrier in each resource period is determined based on a current slot number, a quantity of slots per system frame, the resource periodicity, a quantity of HARQ processes for the semi-persistent resource, and a HARQ process identifier offset; and a HARQ process serial number for a subsequent resource in each resource period is determined based on a resource period number and a resource number.

The HARQ process serial number for the start resource of each transmission carrier in each resource period is determined by using the following formula:

$$\text{HARQ Process ID}=[\text{floor}(\text{CURRENT\_slot}\times 10/(N_{SlotsperFrame}\times T_{periodicity}))]\text{modulo } N_{HARQ\text{-}Processes}+\text{Offset}_{HARQ\ Process\ ID}.$$

Then, remaining HARQ process serial numbers are sequentially allocated based on the resource period number and the resource number.

For example, $T_{periodicity}=10$, $N_{HARQ\text{-}Processes}=4$, $N_{HARQ\text{-}ProcessesPerPeriod}=2$, and the network side configures two resource positions in each period. In this case, "HARQ process serial number=1" is for the 1st resource in the 1st resource period; "HARQ process serial number=2" is for the 1st resource in the 2nd resource period; "HARQ process serial number=1" is for the 1st resource in the 3rd resource period; "HARQ process serial number=2" is for the 1st resource in the 4th resource period; and so on. "HARQ process serial number=3" is for the 2nd resource in the 1st resource period; "HARQ process serial number=4" is for the 2nd resource in the 2nd resource period; "HARQ process serial number=3" is for the 2nd resource in the 3rd resource period; "HARQ process serial number=4" is for the 2nd resource in the 4th resource period; and so on.

Optionally, in the sixth optional implementation, the network device configures or the protocol specifies HARQ configuration information available for the terminal, and the HARQ configuration information includes: at least one of a quantity of HARQ processes for the semi-persistent resource, a HARQ process serial number for the semi-persistent resource (for example, HARQ process serial numbers available for the semi-persistent resource are 1, 2, 3, and 4), a quantity of HARQ processes available for the semi-persistent resource in each resource period (for example, two HARQ processes are available in each resource period), or a HARQ process serial number available for the semi-persistent resource in each resource period.

For example, the UE has a total of four available HARQ processes, and two HARQ processes are available in each resource period. In this case, from the start activation position for the UE, the HARQ process serial numbers in the $1^{st}$ resource period are 1 and 2; the HARQ process serial numbers in the $2^{nd}$ period are 3 and 4; the HARQ process serial numbers in the $3^{rd}$ period are 1 and 2; the HARQ process serial numbers in the $4^{th}$ period are 3 and 4; and so on.

In the sixth optional implementation, after determining the information about the resource position available for the transmission carrier in each resource period and the HARQ process serial number available for the transmission carrier in each resource period based on the resource configuration information of the semi-persistent resource, the terminal transmits data at the resource position available in each resource period by using a corresponding HARQ process serial number.

Optionally, during data transmission based on the determined information about the resource position available and the determined HARQ process serial number available, the terminal first detects whether a resource corresponding to the information about the resource position available and the HARQ process serial number are idle, and if the resource and the HARQ process serial number are idle, transmits the data.

In a seventh optional implementation, the semi-persistent resource is an AUL resource.

AUL is resource allocation implemented by configuring a bitmap (for example, if a value of one bit in 40 bits is set to 1, the resource is allocated to the UE) by the network side. The network side activates or deactivates the use of the AUL resource by using PDCCH control signaling. The PDCCH control signaling indicates that a position of an activated resource (for example, $SFN_{start\ time}$ (a start system frame number), $slot_{start\ time}$ (a start slot number), and $symbol_{start\ time}$ (a start symbol number)), is a start position of the resource. When the UE has uplink data for transmission, the UE autonomously selects a HARQ process from a HARQ process pool configured on the network side to perform transmission.

The determining information about a resource position available for the transmission carrier in each resource period based on the resource configuration information of the semi-persistent resource in Step 202 includes:

in a case in which activation signaling transmitted by a network device is received, determining a start position of the semi-persistent resource based on the activation signaling, and determining information about a start resource position available for the transmission carrier in each resource period based on the resource configuration information and the start position of the semi-persistent resource; or in a case in which the resource allocation information includes allocation information of a resource in each resource period, determining the information about the resource position available for the transmission carrier in each resource period based on allocation information of the semi-persistent resource in each resource period.

The specific implementation process herein is the same as the implementation process in the foregoing fifth optional implementation, and details are not described herein again.

Optionally, in the seventh optional implementation, the network device configures or the protocol specifies HARQ configuration information available for the terminal, and the HARQ configuration information includes a HARQ process serial number pool available for the terminal, for example, HARQ process serial numbers available for the terminal are 1, 2, 3, and 4.

In the seventh optional implementation, after determining the information about the resource position available for the transmission carrier in each resource period and the HARQ process serial number available for the transmission carrier in each resource period based on the resource configuration information of the semi-persistent resource, the terminal transmits data at the resource position available in each resource period by using a corresponding HARQ process serial number.

Optionally, during data transmission based on the determined information about a resource position available, the terminal first detects whether a resource corresponding to the information about the resource position available and the HARQ process serial number are idle, and if the resource and the HARQ process serial number are idle, selects a HARQ process from the available HARQ process serial number pool to transmit the data, for example, selects a HARQ process 1 to transmit the data.

According to the resource configuration method in some embodiments of this disclosure, the resource configuration information of the semi-persistent resource is obtained, where the resource configuration information includes the identification information of the plurality of transmission carriers and the resource allocation information corresponding to the identification information of each transmission carrier. The information about the resource position available for the transmission carrier in each resource period and the HARQ process serial number available for the transmission carrier in each resource period are determined based on the resource configuration information of the semi-persistent resource. In this way, different semi-persistent resources are configured for different uplink transmission carriers and/or downlink transmission carriers, thereby improving utilization of the semi-persistent resources in a case of a plurality of transmission carriers, and reducing a delay caused by scheduling during data transmission.

Figure 3:
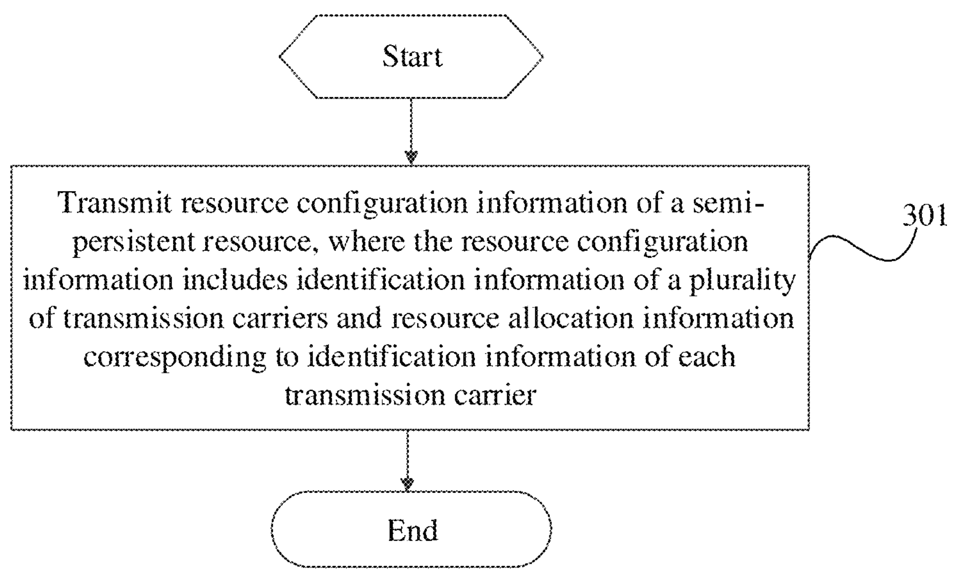
FIG. 3 is a schematic flowchart 2 of a resource configuration method according to some embodiments of this disclosure.

As shown in FIG. 3, some embodiments of this disclosure further provide a resource configuration method applied to a network device. The method includes the following steps.

Step 301: Transmit resource configuration information of a semi-persistent resource, where the resource configuration information includes identification information of a plurality of transmission carriers and resource allocation information corresponding to identification information of each transmission carrier.

The transmission carrier includes a beam or a transmission point. The resource allocation information includes a resource periodicity of the semi-persistent resource.

The identification information of the transmission carrier includes: at least one of a transmission carrier identifier, a cell identity corresponding to the transmission carrier, a frequency identifier corresponding to the transmission carrier, a BWP identifier corresponding to the transmission carrier, a control channel identifier corresponding to the transmission carrier, or a MAC entity identifier corresponding to the transmission carrier.

For example, the cell identity corresponding to the transmission carrier may be specifically cell 1, the frequency identifier corresponding to the transmission carrier may be specifically frequency 1, the BWP identifier corresponding to the transmission carrier may be specifically BWP_1, and the MAC entity identifier corresponding to the transmission carrier may be specifically MAC_1.

The transmission carrier identifier includes: at least one of a SSB identifier, a CSI-RS identifier, or a port number identifier corresponding to a reference signal; and the reference signal includes an SSB and/or a CSI-RS.

In addition to the SSB identifier and/or the CSI-RS identifier, the transmission carrier identifier may be another signal identifier, which is not specifically limited herein.

The port number identifier corresponding to the reference signal may be specifically port_1, and the reference signal may be a reference signal other than the SSB and the CSI-RS, which is not specifically limited herein.

The control channel identifier corresponding to the transmission carrier includes: at least one of a type identifier of a control channel, a resource position identifier of the control channel, a reference signal identifier of the control channel, or a port number identifier corresponding to a reference signal of the control channel.

The type identifier of the control channel may be specifically PDCCH_1 of a primary cell PCell. The resource position identifier of the control channel may be a control resource set (CORESET) and/or search space (search space) identifier. The reference signal identifier of the control channel may be an SSB identifier and/or a CSI-RS identifier.

According to the resource configuration method in some embodiments of this disclosure, when the network device configures the semi-persistent resource for the terminal, different semi-persistent resources are configured for different transmission carriers, thereby improving utilization of the semi-persistent resources in a case of a plurality of transmission carriers, and reducing a delay caused by scheduling during data transmission.

In an optional implementation, the resource allocation information further includes: at least one of allocation information of a semi-persistent resource for the transmission carrier in each resource period or a quantity of HARQ processes for the semi-persistent resource for the transmission carrier.

Herein, the semi-persistent resource is a downlink SPS resource, an uplink configured grant type 2 resource, or an AUL resource.

When the semi-persistent resource is a downlink SPS resource and there is one HARQ process available in each resource period, the resource allocation information further includes the allocation information of the semi-persistent resource for the transmission carrier in each resource period.

When the semi-persistent resource is a downlink SPS resource and there are a plurality of HARQ processes available in each resource period, the resource allocation information further includes at least one of the allocation information of the semi-persistent resource for the transmission carrier in each resource period or the quantity of HARQ processes for the semi-persistent resource for the transmission carrier.

In another optional implementation, the resource allocation information further includes: at least one of allocation information of a semi-persistent resource for the transmission carrier in each resource period, a time-domain offset of the semi-persistent resource for the transmission carrier, or a time-domain length occupied by each time-domain resource in the semi-persistent resource for the transmission carrier.

Herein, the semi-persistent resource is an uplink configured grant type 1 resource.

For example, the time-domain offset may be specifically 10 OFDM symbols, and for a position of SFN=0, the semi-persistent resource for the transmission carrier may be specifically the $10^{th}$ symbol. The time-domain length occupied by each time domain resource may be specifically two symbols.

The allocation information of the semi-persistent resource for the transmission carrier in each resource period includes: at least one of information about a start position for resource allocation, a resource allocation bitmap, resource allocation duration, or a resource allocation short period, where duration of the resource allocation short period is less than duration of the resource period.

For example, the information about the start position for resource allocation may be specifically slot 2, or an offset with respect to an activation position is 2 slots. The resource allocation bitmap may be specifically positions of 10 slots identified by 10 bits, and a resource in a slot position identified by a bit with a value of 1 is determined as a resource allocated to the terminal. The resource allocation duration may be specifically, for a resource with a 40-ms period, resource allocation duration of 10 ms from a start position of the resource. The resource allocation short period may be specifically: for a resource with a 40-ms period, there is resource allocation duration of 10 ms every 40 ms, and the resource allocation short period is 2 ms within 10 ms.

Optionally, in some embodiments of this disclosure, the network device configures or the protocol specifies HARQ configuration information available for the terminal. The HARQ configuration information includes: at least one of a quantity of HARQ processes for the semi-persistent resource, a HARQ process serial number for the semi-persistent resource, a quantity of HARQ processes available for the semi-persistent resource in each resource period, a HARQ process serial number available for the semi-persistent resource in each resource period, or a HARQ process serial number pool available for the terminal.

For the downlink SPS resource, when there is one HARQ process available in each resource period, the HARQ configuration information includes a quantity of HARQ processes for the semi-persistent resource, for example, a total quantity of HARQ processes available for the semi-persistent resource is 4. For the downlink SPS resource, when there are a plurality of HARQ processes available in each resource period, the HARQ configuration information includes: at least one of a quantity of HARQ processes for the semi-persistent resource, a HARQ process serial number for the semi-persistent resource (for example, numbers of HARQ processes available for the semi-persistent resource are 1, 2, 3, and 4), a quantity of HARQ processes available for the semi-persistent resource in each resource period (for example, two HARQ processes are available in each resource period), or a HARQ process serial number available for the semi-persistent resource in each resource period.

For example, the UE has a total of four available HARQ processes, and two HARQ processes are available in each resource period. In this case, from the start activation position for the UE, the HARQ process serial numbers in the $1^{st}$ resource period are 1 and 2; the HARQ process serial numbers in the $2^{nd}$ period are 3 and 4; the HARQ process serial numbers in the $3^{rd}$ period are 1 and 2; the HARQ process serial numbers in the $4^{th}$ period are 3 and 4; and so on.

For the uplink configured grant type 1 resource, when there is one HARQ process available in each resource period, the HARQ configuration information includes a quantity of HARQ processes for the semi-persistent resource, for example, a total quantity of HARQ processes available for the semi-persistent resource is 4.

For the uplink configured grant type 1 resource, when there are a plurality of HARQ processes available in each resource period, the HARQ configuration information includes: at least one of a quantity of HARQ processes for the semi-persistent resource, a HARQ process serial number for the semi-persistent resource (for example, numbers of HARQ processes available for the semi-persistent resource are 1, 2, 3, and 4), a quantity of HARQ processes available for the semi-persistent resource in each resource period (for example, two HARQ processes are available in each resource period), or a HARQ process serial number available for the semi-persistent resource in each resource period.

For the uplink configured grant type 2 resource, when there is one HARQ process available in each resource period, the HARQ configuration information includes a quantity of HARQ processes for the semi-persistent resource, for example, a total quantity of HARQ processes available for the semi-persistent resource is 4.

For the uplink configured grant type 2 resource, when there are a plurality of HARQ processes available in each resource period, the HARQ configuration information includes: at least one of a quantity of HARQ processes for the semi-persistent resource, a HARQ process serial number for the semi-persistent resource (for example, numbers of HARQ processes available for the semi-persistent resource are 1, 2, 3, and 4), a quantity of HARQ processes available for the semi-persistent resource in each resource period (for example, two HARQ processes are available in each resource period), or a HARQ process serial number available for the semi-persistent resource in each resource period.

For the AUL resource, the HARQ configuration information includes a HARQ process serial number pool available for the terminal, for example, HARQ process serial numbers available for the terminal are 1, 2, 3, and 4.

According to the resource configuration method in some embodiments of this disclosure, when the network device configures the semi-persistent resource for the terminal, different semi-persistent resources are configured for different transmission carriers, thereby improving utilization of the semi-persistent resources in a case of a plurality of transmission carriers, and reducing a delay caused by scheduling during data transmission.

Figure 4:
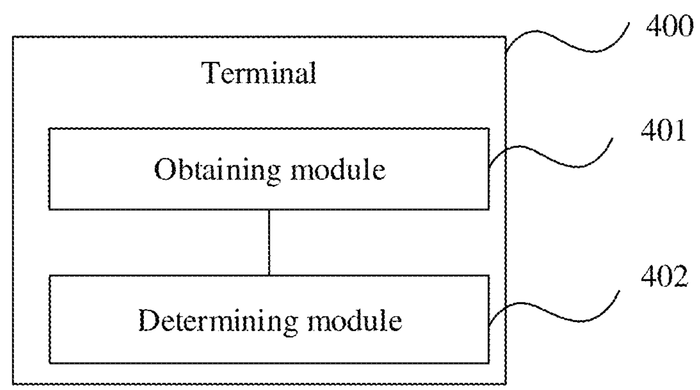
FIG. 4 is a schematic diagram 1 of modules of a terminal according to some embodiments of this disclosure.

FIG. 4 is a schematic diagram of modules of a terminal according to some embodiments of this disclosure. As shown in FIG. 4, some embodiments of this disclosure further provide a terminal 400, including:

an obtaining module 401, configured to obtain resource configuration information of a semi-persistent resource, where the resource configuration information includes identification information of a plurality of transmission carriers and resource allocation information corresponding to identification information of each transmission carrier; and a determining module 402, configured to determine, based on the resource configuration information of the semi-persistent resource, at least one of information about a resource position available for the transmission carrier in each resource period or a HARQ process serial number available for the transmission carrier in each resource period.

According to the terminal in some embodiments of this disclosure, the resource allocation information includes: a resource periodicity.

According to the terminal in some embodiments of this disclosure, the resource allocation information further includes: at least one of allocation information of a semi-persistent resource for the transmission carrier in each resource period or a quantity of HARQ processes for the semi-persistent resource for the transmission carrier.

According to the terminal in some embodiments of this disclosure, the determining module is configured to: in a case in which activation signaling transmitted by a network device is received, determine a start position of the semi-persistent resource based on the activation signaling, and determine information about a start resource position available for the transmission carrier in each resource period based on the resource configuration information and the start position of the semi-persistent resource; or configured to: in a case in which the resource allocation information includes allocation information of a resource in each resource period, determine the information about the resource position available for the transmission carrier in each resource period based on allocation information of the semi-persistent resource in each resource period.

According to the terminal in some embodiments of this disclosure, the semi-persistent resource is a downlink SPS resource, an uplink configured grant type 2 resource, or an AUL resource.

According to the terminal in some embodiments of this disclosure, the resource allocation information further includes: at least one of allocation information of a semi-persistent resource for the transmission carrier in each resource period, a time-domain offset of the semi-persistent resource for the transmission carrier, or a time-domain length occupied by each time-domain resource in the semi-persistent resource for the transmission carrier.

According to the terminal in some embodiments of this disclosure, the determining module is configured to: determine information about a start resource position available for the transmission carrier in each resource period based on the resource configuration information of the semi-persistent resource; or configured to: in a case in which the resource allocation information includes allocation information of a resource in each resource period, determine the information about the resource position available for the transmission carrier in each resource period based on allocation information of the semi-persistent resource in each resource period.

According to the terminal in some embodiments of this disclosure, the semi-persistent resource is an uplink configured grant type 1 resource.

According to the terminal in some embodiments of this disclosure, the allocation information of the semi-persistent resource for the transmission carrier in each resource period includes: at least one of information about a start position for resource allocation, a resource allocation bitmap, resource allocation duration, or a resource allocation short period; and duration of the resource allocation short period is less than duration of the resource period.

Figure 5:
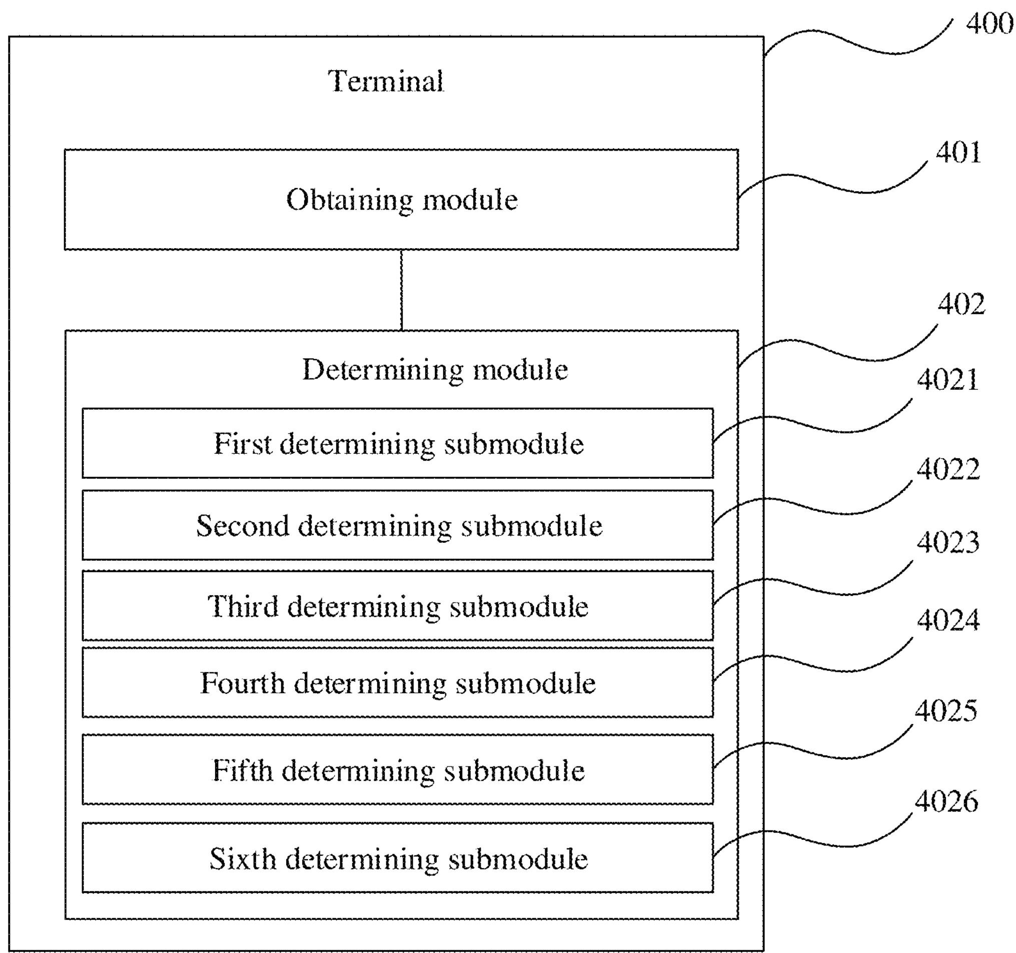
FIG. 5 is a schematic diagram 2 of modules of a terminal according to some embodiments of this disclosure.

As shown in FIG. 5, according to the terminal in some embodiments of this disclosure, when there is one HARQ process available in each resource period, the determining module 402 includes:

a first determining submodule 4021, configured to: in a case in which different transmission carriers correspond to different HARQ entities, determine a HARQ process serial number available for each transmission carrier in each resource period based on the resource periodicity, a current slot number, a quantity of slots per system frame, and a quantity of HARQ processes for the semi-persistent resource; or a second determining submodule 4022, configured to: in a case in which different transmission carriers correspond to a same HARQ entity and correspond to different HARQ process serial numbers, determine a HARQ process serial number available for each transmission carrier in each resource period based on the resource periodicity, a current slot number, a quantity of slots per system frame, a quantity of HARQ processes for the semi-persistent resource, and a HARQ process identifier offset.

According to the terminal in some embodiments of this disclosure, the semi-persistent resource is a downlink SPS resource, an uplink configured grant type 1 resource, or an uplink configured grant type 2 resource.

According to the terminal in some embodiments of this disclosure, the HARQ process identifier offset includes: at least one of a start number of HARQ process identifiers for the transmission carrier, an end number of HARQ process identifiers for the transmission carrier, or a quantity of numbers available for HARQ process identifiers for the transmission carrier.

According to the terminal in some embodiments of this disclosure, when there are a plurality of HARQ processes available in each resource period, the determining module 402 includes:

a third determining submodule 4023, configured to: in a case in which different transmission carriers correspond to different HARQ entities, determine a HARQ process serial number for a start resource for the transmission carrier in each resource period based on a current slot number, a quantity of slots per system frame, the resource periodicity, a quantity of HARQ processes for the semi-persistent resource, and a quantity of HARQ processes per resource period; and determine a HARQ process serial number for a subsequent resource in each resource period based on a resource period number and a resource number; or a fourth determining submodule 4024, configured to: in a case in which different transmission carriers correspond to a same HARQ entity and correspond to different HARQ process serial numbers, determine a HARQ process serial number for a start resource for the transmission carrier in each resource period based on a current slot number, a quantity of slots per system frame, the resource periodicity, a quantity of HARQ processes for the semi-persistent resource, a quantity of HARQ processes per resource period, and a HARQ process identifier offset; and determine a HARQ process serial number for a subsequent resource in each resource period based on a resource period number and a resource number.

According to the terminal in some embodiments of this disclosure, the semi-persistent resource is a downlink SPS resource or an uplink configured grant type 1 resource.

According to the terminal in some embodiments of this disclosure, when there are a plurality of HARQ processes available in each resource period, the determining module 402 includes:

a fifth determining submodule 4025, configured to: in a case in which different transmission carriers correspond to different HARQ entities, determine a HARQ process serial number for a start resource for the transmission carrier in each resource period based on a current slot number, a quantity of slots per system frame, the resource periodicity, and a quantity of HARQ processes for the semi-persistent resource; and determine a HARQ process serial number for a subsequent resource in each resource period based on a resource period number and a resource number; or a sixth determining submodule 4026, configured to: in a case in which different transmission carriers correspond to a same HARQ entity and correspond to different HARQ process serial numbers, determine a HARQ process serial number for a start resource for the transmission carrier in each resource period based on a current slot number, a quantity of slots per system frame, the resource periodicity, a quantity of HARQ processes for the semi-persistent resource, and a HARQ process identifier offset; and determine a HARQ process serial number for a subsequent resource in each resource period based on a resource period number and a resource number.

According to the terminal in some embodiments of this disclosure, the semi-persistent resource is an uplink configured grant type 2 resource.

According to the terminal in some embodiments of this disclosure, the identification information of the transmission carrier includes: at least one of a transmission carrier identifier, a cell identity corresponding to the transmission carrier, a frequency identifier corresponding to the transmission carrier, a BWP identifier corresponding to the transmission carrier, a control channel identifier corresponding to the transmission carrier, or a MAC entity identifier corresponding to the transmission carrier.

According to the terminal in some embodiments of this disclosure, the transmission carrier identifier includes: at least one of a SSB identifier, a CSI-RS identifier, or a port number identifier corresponding to a reference signal; and the reference signal includes an SSB and/or a CSI-RS.

According to the terminal in some embodiments of this disclosure, the control channel identifier corresponding to the transmission carrier includes: at least one of a type identifier of a control channel, a resource position identifier of the control channel, a reference signal identifier of the control channel, or a port number identifier corresponding to a reference signal of the control channel.

It should be noted that a structural block diagram of the terminal shown in FIG. 5 is only a schematic diagram of the terminal in some embodiments of this disclosure. The determining module of the terminal in some embodiments of this disclosure includes at least one of the first determining submodule, the second determining submodule, the third determining submodule, the fourth determining submodule, the fifth determining submodule, or the sixth determining submodule.

According to the terminal in some embodiments of this disclosure, the resource configuration information of the semi-persistent resource is obtained, where the resource configuration information includes the identification information of the plurality of transmission carriers and the resource allocation information corresponding to the identification information of each transmission carrier. At least one of the information about the resource position available for the transmission carrier in each resource period or the HARQ process serial number available for the transmission carrier in each resource period is determined based on the resource configuration information of the semi-persistent resource. In this way, different semi-persistent resources are configured for different uplink transmission carriers and/or downlink transmission carriers, thereby improving utilization of the semi-persistent resources in a case of a plurality of transmission carriers, and reducing a delay caused by scheduling during data transmission.

Some embodiments of this disclosure further provide a terminal, including a memory, a processor, and a computer program stored in the memory and capable of running on the processor. When the computer program is executed by the processor, processes of the foregoing resource configuration method embodiment applied to the terminal can be implemented, with the same technical effects achieved. To avoid repetition, details are not described herein again.

Some embodiments of this disclosure further provide a non-transitory computer-readable storage medium, where a computer program is stored in the non-transitory computer-readable storage medium. When the computer program is executed by a processor, processes of the foregoing resource configuration method embodiment applied to the terminal are implemented, with the same technical effects achieved. To avoid repetition, details are not described herein again. The non-transitory computer-readable storage medium is, for example, a read-only memory (Read-Only Memory, ROM), a random access memory (Random Access Memory, RAM), a magnetic disk, or an optical disc.

Figure 6:
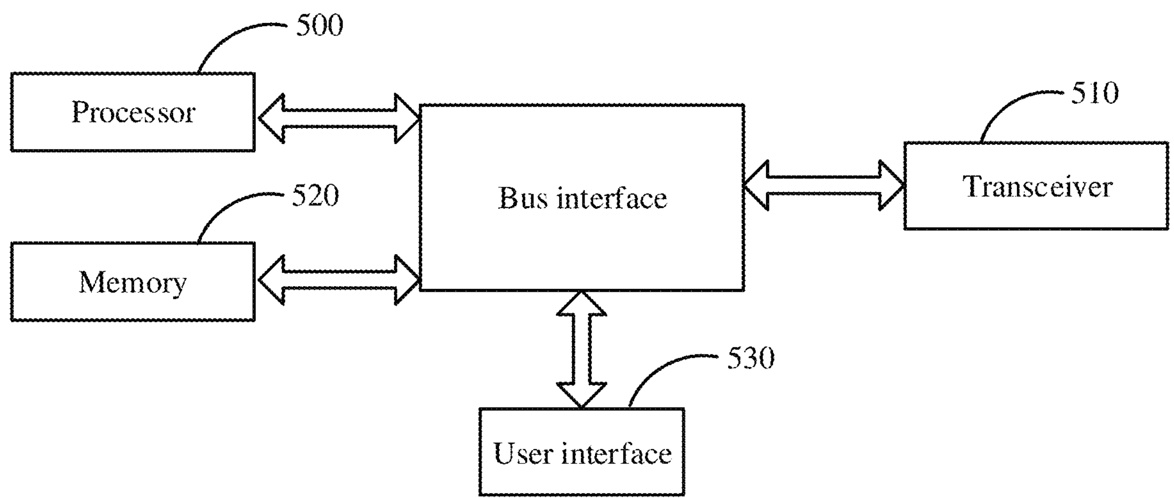
FIG. 6 is a structural block diagram 1 of a terminal according to some embodiments of this disclosure.

In order to better achieve the foregoing objectives, as shown in FIG. 6, some embodiments of this disclosure further provide a terminal, including a memory 520, a processor 500, a transceiver 510, a user interface 530, a bus interface, and a computer program stored in the memory 520 and capable of running on the processor 500. The processor 500 is configured to read the program in the memory 520 and execute the following processes:

obtaining resource configuration information of a semi-persistent resource, where the resource configuration information includes identification information of a plurality of transmission carriers and resource allocation information corresponding to identification information of each transmission carrier; and determining, based on the resource configuration information of the semi-persistent resource, at least one of information about a resource position available for the transmission carrier in each resource period or a HARQ process serial number available for the transmission carrier in each resource period.

In FIG. 6, a bus architecture may include any quantity of interconnected buses and bridges, and connects together circuits that are of one or more processors represented by the processor 500 and of a memory represented by the memory 520. The bus architecture may further interconnect various other circuits such as a peripheral device, a voltage regulator, and a power management circuit. These are all well known in the art, and therefore are not further described in this specification. The bus interface provides an interface. The transceiver 510 may be a plurality of components, that is, the transceiver 510 includes a transmitter and a receiver, and provides a unit for communicating with various other apparatuses on a transmission medium. For different user equipments, the user interface 530 may also be an interface that can be externally or internally connected to a required device. The connected device includes but is not limited to a keypad, a display, a speaker, a microphone, a joystick, and the like.

The processor 500 is responsible for management of the bus architecture and general processing, and the memory 520 is capable of storing data that is used by the processor 500 during operation.

Optionally, the resource allocation information includes a resource periodicity.

Optionally, the resource allocation information further includes: at least one of allocation information of a semi-persistent resource for the transmission carrier in each resource period or a quantity of HARQ processes for the semi-persistent resource for the transmission carrier.

Optionally, the processor 500 reads the program in the memory 520, and is further configured to execute the following steps:

in a case in which activation signaling transmitted by a network device is received, determining a start position of the semi-persistent resource based on the activation signaling, and determining information about a start resource position available for the transmission carrier in each resource period based on the resource configuration information and the start position of the semi-persistent resource; or in a case in which the resource allocation information includes allocation information of a resource in each resource period, determining the information about the resource position available for the transmission carrier in each resource period based on allocation information of the semi-persistent resource in each resource period.

Optionally, the semi-persistent resource is a downlink SPS resource, an uplink configured grant type 2 resource, or an AUL resource.

Optionally, the resource allocation information further includes: at least one of allocation information of a semi-persistent resource for the transmission carrier in each resource period, a time-domain offset of the semi-persistent resource for the transmission carrier, or a time-domain length occupied by each time-domain resource in the semi-persistent resource for the transmission carrier.

Optionally, the processor 500 reads the program in the memory 520, and is further configured to execute the following steps:

determining information about a start resource position available for the transmission carrier in each resource period based on the resource configuration information of the semi-persistent resource; or in a case in which the resource allocation information includes allocation information of a resource in each resource period, determining the information about the resource position available for the transmission carrier in each resource period based on allocation information of the semi-persistent resource in each resource period.

Optionally, the semi-persistent resource is an uplink configured grant type 1 resource.

Optionally, the allocation information of the semi-persistent resource for the transmission carrier in each resource period includes: at least one of information about a start position for resource allocation, a resource allocation bitmap, resource allocation duration, or a resource allocation short period; and duration of the resource allocation short period is less than duration of the resource period.

Optionally, when there is one HARQ process available in each resource period, the processor 500 reads the program in the memory 520, and is further configured to execute the following steps:

in a case in which different transmission carriers correspond to different HARQ entities, determining a HARQ process serial number available for each transmission carrier in each resource period based on the resource periodicity, a current slot number, a quantity of slots per system frame, and a quantity of HARQ processes for the semi-persistent resource; or in a case in which different transmission carriers correspond to a same HARQ entity and correspond to different HARQ process serial numbers, determining a HARQ process serial number available for each transmission carrier in each resource period based on the resource periodicity, a current slot number, a quantity of slots per system frame, a quantity of HARQ processes for the semi-persistent resource, and a HARQ process identifier offset.

Optionally, the semi-persistent resource is a downlink SPS resource, an uplink configured grant type 1 resource, or an uplink configured grant type 2 resource.

Optionally, the HARQ process identifier offset includes: at least one of a start number of HARQ process identifiers for the transmission carrier, an end number of HARQ process identifiers for the transmission carrier, or a quantity of numbers available for HARQ process identifiers for the transmission carrier.

Optionally, when there are a plurality of HARQ processes available in each resource period, the processor 500 reads the program in the memory 520, and is further configured to execute the following steps:

in a case in which different transmission carriers correspond to different HARQ entities, determining a HARQ process serial number for a start resource for the transmission carrier in each resource period based on a current slot number, a quantity of slots per system frame, the resource periodicity, a quantity of HARQ processes for the semi-persistent resource, and a quantity of HARQ processes per resource period; and determining a HARQ process serial number for a subsequent resource in each resource period based on a resource period number and a resource number; or in a case in which different transmission carriers correspond to a same HARQ entity and correspond to different HARQ process serial numbers, determining a HARQ process serial number for a start resource for the transmission carrier in each resource period based on a current slot number, a quantity of slots per system frame, the resource periodicity, a quantity of HARQ processes for the semi-persistent resource, a quantity of HARQ processes per resource period, and a HARQ process identifier offset; and determining a HARQ process serial number for a subsequent resource in each resource period based on a resource period number and a resource number.

Optionally, the semi-persistent resource is a downlink SPS resource or an uplink configured grant type 1 resource.

Optionally, when there are a plurality of HARQ processes available in each resource period, the processor 500 reads the program in the memory 520, and is further configured to execute the following steps:

in a case in which different transmission carriers correspond to different HARQ entities, determining a HARQ process serial number for a start resource for the transmission carrier in each resource period based on a current slot number, a quantity of slots per system frame, the resource periodicity, and a quantity of HARQ processes for the semi-persistent resource; and determining a HARQ process serial number for a subsequent resource in each resource period based on a resource period number and a resource number; or in a case in which different transmission carriers correspond to a same HARQ entity and correspond to different HARQ process serial numbers, determining a HARQ process serial number for a start resource for the transmission carrier in each resource period based on a current slot number, a quantity of slots per system frame, the resource periodicity, a quantity of HARQ processes for the semi-persistent resource, and a HARQ process identifier offset; and determining a HARQ process serial number for a subsequent resource in each resource period based on a resource period number and a resource number.

Optionally, the semi-persistent resource is an uplink configured grant type 2 resource.

Optionally, the identification information of the transmission carrier includes: at least one of a transmission carrier identifier, a cell identity corresponding to the transmission carrier, a frequency identifier corresponding to the transmission carrier, a BWP identifier corresponding to the transmission carrier, a control channel identifier corresponding to the transmission carrier, or a MAC entity identifier corresponding to the transmission carrier.

Optionally, the transmission carrier identifier includes: at least one of a SSB identifier, a CSI-RS identifier, and a port number identifier corresponding to a reference signal; or the reference signal includes an SSB and/or a CSI-RS.

Optionally, the control channel identifier corresponding to the transmission carrier includes: at least one of a type identifier of a control channel, a resource position identifier of the control channel, a reference signal identifier of the control channel, or a port number identifier corresponding to a reference signal of the control channel.

According to the terminal in some embodiments of this disclosure, the resource configuration information of the semi-persistent resource is obtained, where the resource configuration information includes the identification information of the plurality of transmission carriers and the resource allocation information corresponding to the identification information of each transmission carrier. At least one of the information about the resource position available for the transmission carrier in each resource period or the HARQ process serial number available for the transmission carrier in each resource period is determined based on the resource configuration information of the semi-persistent resource. In this way, different semi-persistent resources are configured for different uplink transmission carriers and/or downlink transmission carriers, thereby improving utilization of the semi-persistent resources in a case of a plurality of transmission carriers, and reducing a delay caused by scheduling during data transmission.

Figure 7:
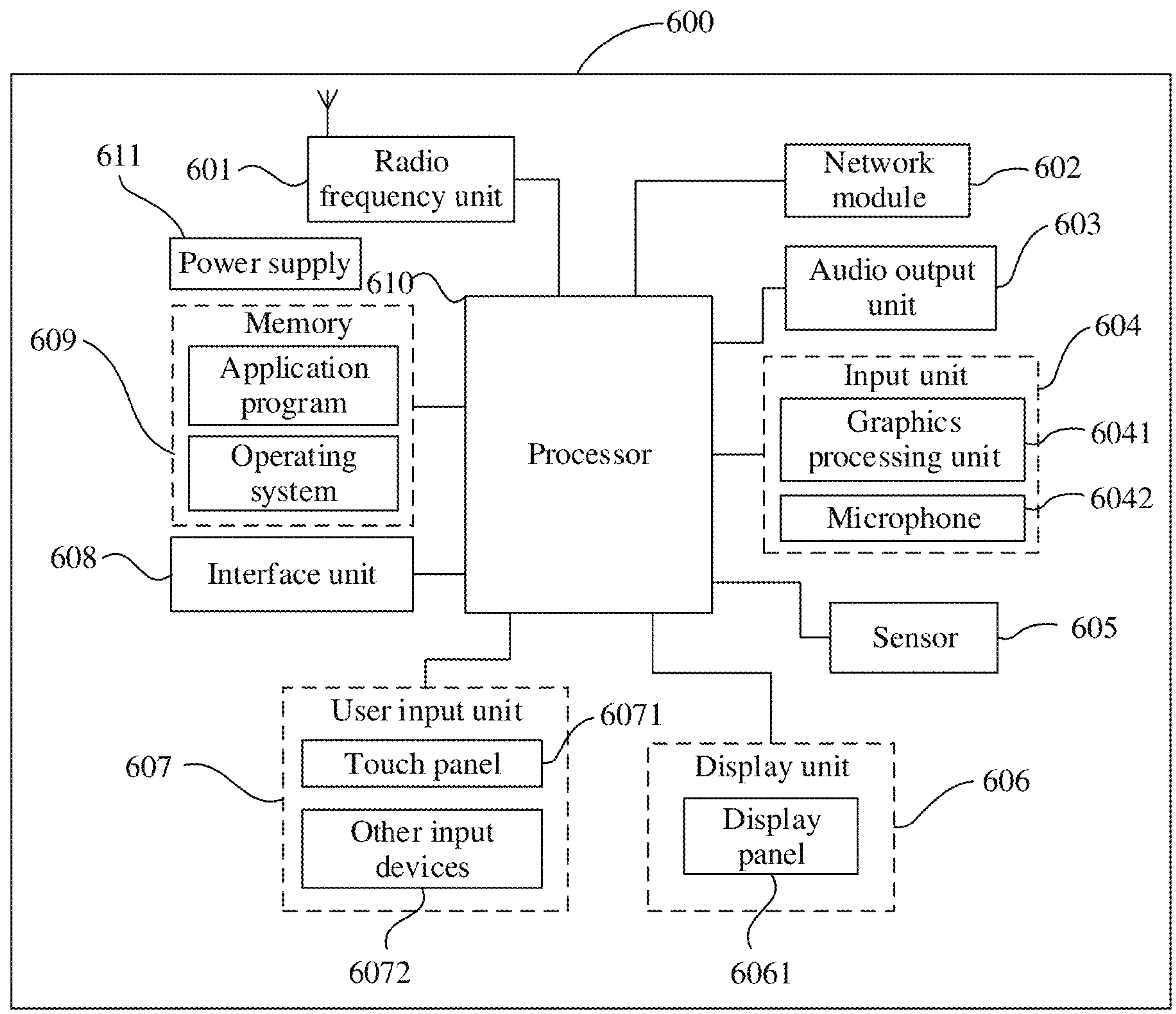
FIG. 7 is a structural block diagram 2 of a terminal according to some embodiments of this disclosure.

FIG. 7 is a schematic structural diagram of hardware of a terminal according to the embodiments of this disclosure. The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. Persons skilled in the art can understand that a structure of the terminal shown in FIG. 7 does not constitute any limitation on the terminal, and the terminal may include more or fewer components than those shown in the figure, or a combination of some components, or the components disposed differently. In some embodiments of this disclosure, the terminal includes but is not limited to a mobile phone, a tablet computer, a laptop computer, a palmtop computer, an in-vehicle terminal, a wearable device, a pedometer, and the like.

The processor 610 is configured to obtain resource configuration information of a semi-persistent resource, where the resource configuration information includes identification information of a plurality of transmission carriers and resource allocation information corresponding to identification information of each transmission carrier; and determine, based on the resource configuration information of the semi-persistent resource, at least one of information about a resource position available for the transmission carrier in each resource period or a HARQ process serial number available for the transmission carrier in each resource period.

In the technical solution in some embodiments of this disclosure, the resource configuration information of the semi-persistent resource is obtained, where the resource configuration information includes identification information of a plurality of transmission carriers and resource allocation information corresponding to identification information of each transmission carrier. At least one of information about a resource position available for the transmission carrier in each resource period or a HARQ process serial number available for the transmission carrier in each resource period is determined based on the resource configuration information of the semi-persistent resource. In this way, different semi-persistent resources are configured for different uplink transmission carriers and/or downlink transmission carriers, thereby improving utilization of the semi-persistent resources in a case of a plurality of transmission carriers, and reducing a delay caused by scheduling during data transmission.

It should be understood that in some embodiments of this disclosure, the radio frequency unit 601 may be configured to receive and send information, or to receive and send a signal in a call process. The radio frequency unit 601 may send the downlink data to the processor 610 for processing after receiving downlink data from a network device; and also send uplink data to the network device. Generally, the radio frequency unit 601 includes but is not limited to an antenna, at least one amplifier, a transceiver, a coupler, a low noise amplifier, a duplexer, and the like. In addition, the radio frequency unit 601 may also communicate with a network and other devices via a wireless communications system.

The terminal provides a user with wireless broadband internet access through the network module 602, for example, helping the user to transmit and receive e-mails, browse web pages, and access streaming media.

The audio output unit 603 may convert audio data received by the radio frequency unit 601 or the network module 602 or stored in the memory 609 into an audio signal and output the audio signal as a sound. Furthermore, the audio output unit 603 may also provide audio output (for example, a call signal received sound or a message received sound) related to a specific function performed by the terminal 600. The audio output unit 603 includes a speaker, a buzzer, a phone receiver, and the like.

The input unit 604 is configured to receive an audio or video signal. The input unit 604 may include a graphics processing unit (GPU) 6041 and a microphone 6042. The graphics processing unit 6041 processes image data of a still picture or video obtained by an image capture apparatus (such as a camera) in a video capture mode or an image capture mode. A processed image frame may be displayed on the display unit 606. The image frame processed by the graphics processing unit 6041 may be stored in the memory 609 (or another storage medium) or be sent by the radio frequency unit 601 or the network module 602. The microphone 6042 is capable of receiving sounds and processing such sounds into audio data. The processed audio data can be converted into a format output that can be sent to a mobile communication network device through the radio frequency unit 601 in a telephone call mode.

The terminal 600 may further include at least one sensor 605, for example, an optical sensor, a motion sensor, and another sensor. The optical sensor may include an ambient light sensor and a proximity sensor. The ambient light sensor may adjust luminance of the display panel 6061 based on brightness of ambient light, and the proximity sensor may turn off the display panel 6061 and/or backlight when the terminal 600 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided to the user. The display unit 606 may include a display panel 6061, and the display panel 6061 may be configured in a form of a liquid crystal display (Liquid Crystal Display, LCD), an organic light-emitting diode (Organic Light-Emitting Diode, OLED), or the like.

The user input unit 607 may be configured to receive input digit or character information and generate key signal input related to user setting and function control of the mobile terminal. The user input unit 607 may include a touch panel 6071 and other input devices 6072. The touch panel 6071 is also referred to as a touchscreen and can collect a touch operation (such as an operation performed by the user on the touch panel 6071 or near the touch panel 6071 with a finger or by using any proper object or accessory such as a stylus) of the user on or near the touch panel 6071. The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 610, and receives and executes a command sent by the processor 610. In addition, the touch panel 6071 may be implemented in a plurality of forms, for example, as a resistive, capacitive, infrared, or surface acoustic wave touch panel. In addition to the touch panel 6071, the user input unit 607 may further include other input devices 6072. The other input devices 6072 may include but are not limited to a physical keyboard, a function key (such as a volume control key or a power on/off key), a trackball, a mouse, a joystick, and the like. Details are not described herein.

The touch panel 6071 may cover the display panel 6061. When detecting a touch operation on or near the touch panel 6071, the touch panel 6071 transmits the touch operation to the processor 610 to determine a type of a touch event. Then, the processor 610 provides a corresponding visual output on the display panel 6061 based on the type of the touch event. Although in FIG. 7, the touch panel 6071 and the display panel 6061 act as two independent parts to implement input and output functions of the terminal, in some embodiments, the touch panel 6071 and the display panel 6061 may be integrated to implement the input and output functions of the terminal. This is not specifically limited herein.

The interface unit 608 is an interface between an external apparatus and the terminal 600. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 608 may be configured to receive an input (for example, data information or power) from an external apparatus and transmit the received input to one or more elements within the terminal 600, or may be configured to transmit data between the terminal 600 and the external apparatus.

The memory 609 may be configured to store software programs and various data. The memory 609 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 609 may include a high-speed random access memory, and may further include a non-volatile memory, for example, at least one disk storage device, flash memory device, or may include other volatile solid-state storage device.

The processor 610 is a control center of the terminal, and is connected to all components of the terminal by using various interfaces and lines. By running or executing a software program and/or module that is stored in the memory 609 and calling data stored in the memory 609, the processor 610 executes various functions of the terminal and processes data, so as to perform overall monitoring on the terminal. The processor 610 may include one or more processing units. Optionally, an application processor and a modem processor may be integrated in the processor 610. The application processor primarily processes an operating system, user interfaces, application programs, and the like. The modem processor primarily processes radio communication. It can be understood that the modem processor may alternatively be not integrated in the processor 610.

The terminal 600 may further include the power supply 611 (for example, a battery) supplying power to all components. Optionally, the power supply 611 may be logically connected to the processor 610 through a power management system. In this way, functions such as charge management, discharge management, and power consumption management are implemented by using the power management system.

In addition, the terminal 600 includes some functional modules that are not shown. Details are not described herein.

Figure 8:
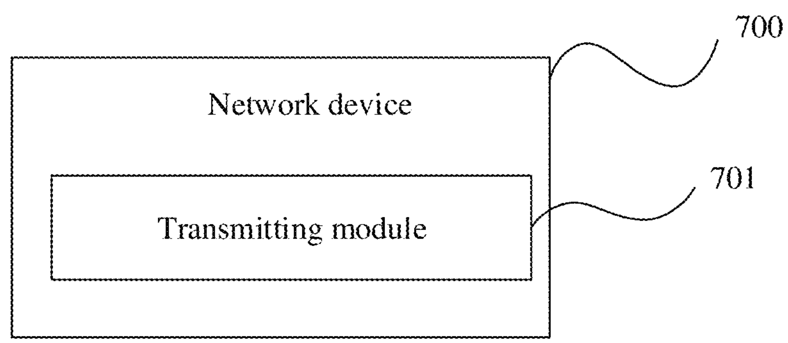
FIG. 8 is a schematic diagram of modules of a network device according to some embodiments of this disclosure.

As shown in FIG. 8, some embodiments of this disclosure further provide a network device 700, including:

a transmitting module 701, configured to transmit resource configuration information of a semi-persistent resource, where the resource configuration information includes identification information of a plurality of transmission carriers and resource allocation information corresponding to identification information of each transmission carrier.

According to the network device in some embodiments of this disclosure, when the network device configures the semi-persistent resource for the terminal, different semi-persistent resources are configured for different transmission carriers, thereby improving utilization of the semi-persistent resources in a case of a plurality of transmission carriers, and reducing a delay caused by scheduling during data transmission.

According to the network device in this embodiment of this disclosure, the resource allocation information includes: a resource periodicity.

According to the network device in some embodiments of this disclosure, the resource allocation information further includes: at least one of allocation information of a semi-persistent resource for the transmission carrier in each resource period or a quantity of HARQ processes for the semi-persistent resource for the transmission carrier.

According to the network device in this embodiment of this disclosure, the semi-persistent resource is a downlink SPS resource, an uplink configured grant type 2 resource, or an AUL resource.

According to the network device in some embodiments of this disclosure, the resource allocation information further includes: at least one of allocation information of a semi-persistent resource for the transmission carrier in each resource period, a time-domain offset of the semi-persistent resource for the transmission carrier, or a time-domain length occupied by each time-domain resource in the semi-persistent resource for the transmission carrier.

According to the network device in some embodiments of this disclosure, the semi-persistent resource is an uplink configured grant type 1 resource.

According to the network device in some embodiments of this disclosure, the allocation information of the semi-persistent resource for the transmission carrier in each resource period includes: at least one of information about a start position for resource allocation, a resource allocation bitmap, resource allocation duration, or a resource allocation short period; and duration of the resource allocation short period is less than duration of the resource period.

According to the network device in some embodiments of this disclosure, the identification information of the transmission carrier includes: at least one of a transmission carrier identifier, a cell identity corresponding to the transmission carrier, a frequency identifier corresponding to the transmission carrier, a BWP identifier corresponding to the transmission carrier, a control channel identifier corresponding to the transmission carrier, or a MAC entity identifier corresponding to the transmission carrier.

According to the network device in some embodiments of this disclosure, the transmission carrier identifier includes: at least one of a SSB identifier, a CSI-RS identifier, or a port number identifier corresponding to a reference signal; and the reference signal includes an SSB and/or a CSI-RS.

According to the network device in some embodiments of this disclosure, the control channel identifier corresponding to the transmission carrier includes: at least one of a type identifier of a control channel, a resource position identifier of the control channel, a reference signal identifier of the control channel, or a port number identifier corresponding to a reference signal of the control channel.

According to the network device in some embodiments of this disclosure, when the network device configures the semi-persistent resource for the terminal, different semi-persistent resources are configured for different transmission carriers, thereby improving utilization of the semi-persistent resources in a case of a plurality of transmission carriers, and reducing a delay caused by scheduling during data transmission.

Some embodiments of this disclosure further provide a network device, including a memory, a processor, and a computer program stored in the memory and capable of running on the processor. When the computer program is executed by the processor, processes of the foregoing resource configuration method embodiment applied to the network device can be implemented, with the same technical effects achieved. To avoid repetition, details are not described herein again.

Some embodiments of this disclosure further provide a non-transitory computer-readable storage medium, where a computer program is stored in the non-transitory computer-readable storage medium. When the computer program is executed by a processor, processes of the foregoing resource configuration method embodiment applied to the network device are implemented, with the same technical effects achieved. To avoid repetition, details are not described herein again. The non-transitory computer-readable storage medium is, for example, a read-only memory (Read-Only Memory, ROM), a random access memory (Random Access Memory, RAM), a magnetic disk, or an optical disc.

Figure 9:
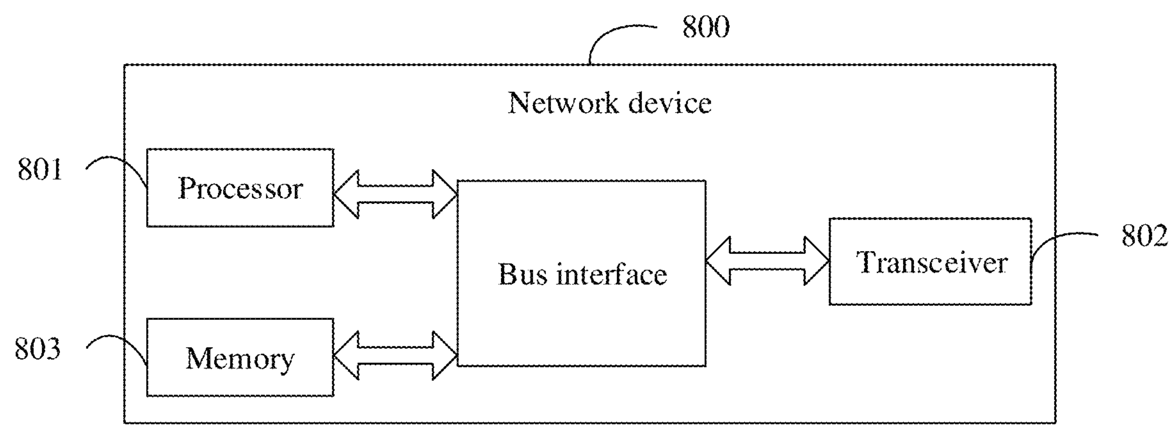
FIG. 9 is a structural block diagram of a network device according to some embodiments of this disclosure.

As shown in FIG. 9, some embodiments of this disclosure further provide a network device 800, including a processor 801, a transceiver 802, a memory 803, and a bus interface.

The processor 801 is configured to read a program in the memory 803 and execute the following process:

transmitting resource configuration information of a semi-persistent resource, where the resource configuration information includes identification information of a plurality of transmission carriers and resource allocation information corresponding to identification information of each transmission carrier.

In FIG. 9, a bus architecture may include any quantity of interconnected buses and bridges, and connects together circuits that are of one or more processors represented by the processor 801 and of a memory represented by the memory 803. The bus architecture may further interconnect various other circuits such as a peripheral device, a voltage regulator, and a power management circuit. These are all well known in the art, and therefore are not further described in this specification. The bus interface provides an interface. The transceiver 802 may be a plurality of components, including a transmitter and a receiver, and provides units for communicating with a variety of other apparatuses on a transmission medium.

The processor 801 is responsible for management of the bus architecture and general processing, and the memory 803 is capable of storing data that is used by the processor 801 during operation.

Optionally, the resource allocation information includes a resource periodicity.

Optionally, the resource allocation information further includes: at least one of allocation information of a semi-persistent resource for the transmission carrier in each resource period or a quantity of HARQ processes for the semi-persistent resource for the transmission carrier.

Optionally, the semi-persistent resource is a downlink SPS resource, an uplink configured grant type 2 resource, or an AUL resource.

Optionally, the resource allocation information further includes: at least one of allocation information of a semi-persistent resource for the transmission carrier in each resource period, a time-domain offset of the semi-persistent resource for the transmission carrier, or a time-domain length occupied by each time-domain resource in the semi-persistent resource for the transmission carrier.

Optionally, the semi-persistent resource is an uplink configured grant type 1 resource.

Optionally, the allocation information of the semi-persistent resource for the transmission carrier in each resource period includes: at least one of information about a start position for resource allocation, a resource allocation bitmap, resource allocation duration, or a resource allocation short period; and duration of the resource allocation short period is less than duration of the resource period.

Optionally, the identification information of the transmission carrier includes: at least one of a transmission carrier identifier, a cell identity corresponding to the transmission carrier, a frequency identifier corresponding to the transmission carrier, a BWP identifier corresponding to the transmission carrier, a control channel identifier corresponding to the transmission carrier, or a MAC entity identifier corresponding to the transmission carrier.

Optionally, the transmission carrier identifier includes: at least one of a SSB identifier, a CSI-RS identifier, and a port number identifier corresponding to a reference signal; or the reference signal includes an SSB and/or a CSI-RS.

Optionally, the control channel identifier corresponding to the transmission carrier includes: at least one of a type identifier of a control channel, a resource position identifier of the control channel, a reference signal identifier of the control channel, or a port number identifier corresponding to a reference signal of the control channel.

According to the network device in some embodiments of this disclosure, when the network device configures the semi-persistent resource for the terminal, different semi-persistent resources are configured for different transmission carriers, thereby improving utilization of the semi-persistent resources in a case of a plurality of transmission carriers, and reducing a delay caused by scheduling during data transmission.

It should be noted that the terms "include", "comprise", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more restrictions, an element preceded by "includes a . . . " does not preclude the existence of other identical elements in the process, method, article, or apparatus that includes the element.

According to the foregoing description of the implementation manners, a person skilled in the art may clearly understand that the foregoing embodiments may be implemented by using software in combination with a necessary common hardware platform, and certainly may alternatively be implemented by using hardware. However, in most cases, the former is a preferred implementation manner. Based on such an understanding, the technical solutions of this disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A resource configuration method, applied to a terminal and comprising:

obtaining resource configuration information of a semi-persistent resource, wherein the resource configuration information comprises identification information of a plurality of transmission carriers and resource allocation information corresponding to identification information of each transmission carrier; and determining, based on the resource configuration information of the semi-persistent resource, at least one of information about a resource position available for the transmission carrier in each resource period or a hybrid automatic repeat request (HARQ) process serial number available for the transmission carrier in each resource period; wherein the resource allocation information comprises a resource periodicity;

when there is one HARQ process available in each resource period, determining the HARQ process serial number available for the transmission carrier in each resource period based on the resource configuration information of the semi-persistent resource comprises:

in a case in which different transmission carriers correspond to different HARQ entities, determining a HARQ process serial number available for each transmission carrier in each resource period based on the resource periodicity, a current slot number, a quantity of slots per system frame, and a quantity of HARQ processes for the semi-persistent resource; or in a case in which different transmission carriers correspond to a same HARQ entity and correspond to different HARQ process serial numbers, determining a HARQ process serial number available for each transmission carrier in each resource period based on the resource periodicity, a current slot number, a quantity of slots per system frame, a quantity of HARQ processes for the semi-persistent resource, and a HARQ process identifier offset;

when there are a plurality of HARQ processes available in each resource period, determining the HARQ process serial number available for the transmission carrier in each resource period based on the resource configuration information of the semi-persistent resource comprises:

in a case in which different transmission carriers correspond to different HARQ entities, determining a HARQ process serial number for a start resource for the transmission carrier in each resource period based on a current slot number, a quantity of slots per system frame, the resource periodicity, a quantity of HARQ processes for the semi-persistent resource, and a quantity of HARQ processes per resource period; and determining a HARQ process serial number for a subsequent resource in each resource period based on a resource period number and a resource number; or in a case in which different transmission carriers correspond to a same HARQ entity and correspond to different HARQ process serial numbers, determining a HARQ process serial number for a start resource for the transmission carrier in each resource period based on a current slot number, a quantity of slots per system frame, the resource periodicity, a quantity of HARQ processes for the semi-persistent resource, a quantity of HARQ processes per resource period, and a HARQ process identifier offset; and determining a HARQ process serial number for a subsequent resource in each resource period based on a resource period number and a resource number;

when there are a plurality of HARQ processes available in each resource period, determining the HARQ process serial number available for the transmission carrier in each resource period based on the resource configuration information of the semi-persistent resource comprises:

in a case in which different transmission carriers correspond to different HARQ entities, determining a HARQ process serial number for a start resource for the transmission carrier in each resource period based on a current slot number, a quantity of slots per system frame, the resource periodicity, and a quantity of HARQ processes for the semi-persistent resource; and determining a HARQ process serial number for a subsequent resource in each resource period based on a resource period number and a resource number; or in a case in which different transmission carriers correspond to a same HARQ entity and correspond to different HARQ process serial numbers, determining a HARQ process serial number for a start resource for the transmission carrier in each resource period based on a current slot number, a quantity of slots per system frame, the resource periodicity, a quantity of HARQ processes for the semi-persistent resource, and a HARQ process identifier offset; and determining a HARQ process serial number for a subsequent resource in each resource period based on a resource period number and a resource number.

2. The resource allocation method according to claim 1, wherein the resource allocation information further comprises: at least one of allocation information of a semi-persistent resource for the transmission carrier in each resource period or a quantity of HARQ processes for the semi-persistent resource for the transmission carrier.

3. The resource configuration method according to claim 2, wherein determining information about the resource position available for the transmission carrier in each resource period based on the resource configuration information of the semi-persistent resource comprises:

in a case in which activation signaling transmitted by a network device is received, determining a start position of the semi-persistent resource based on the activation signaling, and determining information about a start resource position available for the transmission carrier in each resource period based on the resource configuration information and the start position of the semi-persistent resource; or in a case in which the resource allocation information comprises allocation information of a resource in each resource period, determining the information about the resource position available for the transmission carrier in each resource period based on allocation information of the semi-persistent resource in each resource period.

4. The resource allocation method according to claim 1, wherein the resource allocation information further comprises: at least one of allocation information of a semi-persistent resource for the transmission carrier in each resource period, a time-domain offset of the semi-persistent resource for the transmission carrier, or a time-domain length occupied by each time-domain resource in the semi-persistent resource for the transmission carrier.

5. The resource configuration method according to claim 4, wherein determining information about the resource position available for the transmission carrier in each resource period based on the resource configuration information of the semi-persistent resource comprises:

determining information about a start resource position available for the transmission carrier in each resource period based on the resource configuration information of the semi-persistent resource; or in a case in which the resource allocation information comprises allocation information of a resource in each resource period, determining the information about the resource position available for the transmission carrier in each resource period based on allocation information of the semi-persistent resource in each resource period.

6. The resource allocation method according to claim 4, wherein the allocation information of the semi-persistent resource for the transmission carrier in each resource period comprises: at least one of information about a start position for resource allocation, a resource allocation bitmap, resource allocation duration, or a resource allocation short period; and duration of the resource allocation short period is less than duration of the resource period.

7. The resource configuration method according to claim 1, wherein the HARQ process identifier offset comprises: at least one of a start number of HARQ process identifiers for the transmission carrier, an end number of HARQ process identifiers for the transmission carrier, or a quantity of numbers available for HARQ process identifiers for the transmission carrier.

8. The resource allocation method according to claim 1, wherein the identification information of the transmission carrier comprises: at least one of a transmission carrier identifier, a cell identity corresponding to the transmission carrier, a frequency identifier corresponding to the transmission carrier, a bandwidth part (BWP) identifier corresponding to the transmission carrier, a control channel identifier corresponding to the transmission carrier, or a medium access control (MAC) entity identifier corresponding to the transmission carrier.

9. The resource configuration method according to claim 8, wherein the transmission carrier identifier comprises: at least one of a synchronization signal block (SSB) identifier, a channel state information reference signal (CSI-RS) identifier, or a port number identifier corresponding to a reference signal; and the reference signal comprises an SSB and/or a CSI-RS.

10. The resource configuration method according to claim 8, wherein the control channel identifier corresponding to the transmission carrier comprises: at least one of a type identifier of a control channel, a resource position identifier of the control channel, a reference signal identifier of the control channel, or a port number identifier corresponding to a reference signal of the control channel.

11. A terminal, comprising a memory, a processor, and a computer program stored in the memory and capable of running on the processor, wherein when the computer program is executed by the processor, the step of the resource configuration method according to claim 1 is implemented.

12. A non-transitory computer-readable storage medium, wherein a computer program is stored in the non-transitory computer-readable storage medium, and when the computer program is executed by a processor, implement:

obtaining resource configuration information of a semi-persistent resource, the resource configuration information comprises identification information of a plurality of transmission carriers and resource allocation information corresponding to identification information of each transmission carrier; and determining, based on the resource configuration information of the semi-persistent resource, at least one of information about a resource position available for the transmission carrier in each resource period or a hybrid automatic repeat request (HARQ) process serial number available for the transmission carrier in each resource period; wherein the resource allocation information comprises a resource periodicity;

when there is one HARQ process available in each resource period, determining the HARQ process serial number available for the transmission carrier in each resource period based on the resource configuration information of the semi-persistent resource comprises:

in a case in which different transmission carriers correspond to different HARQ entities, determining a HARQ process serial number available for each transmission carrier in each resource period based on the resource periodicity, a current slot number, a quantity of slots per system frame, and a quantity of HARQ processes for the semi-persistent resource; or in a case in which different transmission carriers correspond to a same HARQ entity and correspond to different HARQ process serial numbers, determining a HARQ process serial number available for each transmission carrier in each resource period based on the resource periodicity, a current slot number, a quantity of slots per system frame, a quantity of HARQ processes for the semi-persistent resource, and a HARQ process identifier offset;

when there are a plurality of HARQ processes available in each resource period, determining the HARQ process serial number available for the transmission carrier in each resource period based on the resource configuration information of the semi-persistent resource comprises:

in a case in which different transmission carriers correspond to different HARQ entities, determining a HARQ process serial number for a start resource for the transmission carrier in each resource period based on a current slot number, a quantity of slots per system frame, the resource periodicity, a quantity of HARQ processes for the semi-persistent resource, and a quantity of HARQ processes per resource period; and determining a HARQ process serial number for a subsequent resource in each resource period based on a resource period number and a resource number; or in a case in which different transmission carriers correspond to a same HARQ entity and correspond to different HARQ process serial numbers, determining a HARQ process serial number for a start resource for the transmission carrier in each resource period based on a current slot number, a quantity of slots per system frame, the resource periodicity, a quantity of HARQ processes for the semi-persistent resource, a quantity of HARQ processes per resource period, and a HARQ process identifier offset; and determining a HARQ process serial number for a subsequent resource in each resource period based on a resource period number and a resource number;

when there are a plurality of HARQ processes available in each resource period, determining the HARQ process serial number available for the transmission carrier in each resource period based on the resource configuration information of the semi-persistent resource comprises:

in a case in which different transmission carriers correspond to different HARQ entities, determining a HARQ process serial number for a start resource for the transmission carrier in each resource period based on a current slot number, a quantity of slots per system frame, the resource periodicity, and a quantity of HARQ processes for the semi-persistent resource; and determining a HARQ process serial number for a subsequent resource in each resource period based on a resource period number and a resource number; or in a case in which different transmission carriers correspond to a same HARQ entity and correspond to different HARQ process serial numbers, determining a HARQ process serial number for a start resource for the transmission carrier in each resource period based on a current slot number, a quantity of slots per system frame, the resource periodicity, a quantity of HARQ processes for the semi-persistent resource, and a HARQ process identifier offset and determining a HARQ process serial number for a subsequent resource in each resource period based on a resource period number and a resource number.

* * * * *